US012724843B2

(12) United States Patent
Saito

(10) Patent No.: US 12,724,843 B2
(45) Date of Patent: Sep. 1, 2026

(54) WEB DATABASE SYSTEM, PROCESSING EXECUTION METHOD, AND INFORMATION STORAGE MEDIUM

(71) Applicant: Cybozu, Inc., Tokyo (JP)

(72) Inventor: Yuta Saito, Saitama (JP)

(73) Assignee: CYBOZU, INC., Tokyo (JP)

( * ) Notice: Subject to any disclaimer, the term of this patent is extended or adjusted under 35 U.S.C. 154(b) by 34 days.

(21) Appl. No.: 18/508,299

(22) Filed: Nov. 14, 2023

(65) Prior Publication Data

US 2024/0169012 A1 May 23, 2024

(30) Foreign Application Priority Data

Nov. 17, 2022 (JP) ................................ 2022-184258

(51) Int. Cl.

| | |
|---|---|
| ***G06F 16/958*** | (2019.01) |
| ***G06F 3/0483*** | (2013.01) |
| ***G06F 3/0484*** | (2022.01) |
| ***G06F 40/177*** | (2020.01) |

(52) U.S. Cl.

CPC .......... *G06F 16/986* (2019.01); *G06F 3/0483* (2013.01); *G06F 3/0484* (2013.01); *G06F 40/177* (2020.01)

(58) Field of Classification Search

CPC .... G06F 16/986; G06F 3/0483; G06F 3/0484; G06F 40/177

See application file for complete search history.

(56) References Cited

U.S. PATENT DOCUMENTS

| | | | | |
|---|---|---|---|---|
| 11,250,525 | B2 * | 2/2022 | Haldane | G06F 3/1454 |
| 2009/0254589 | A1 * | 10/2009 | Nair | G06F 16/275 |
| 2010/0174693 | A1 * | 7/2010 | Chandrasekhara | G06F 16/90332 707/698 |
| 2011/0030031 | A1 * | 2/2011 | Lussier | H04L 65/756 709/219 |

(Continued)

FOREIGN PATENT DOCUMENTS

| | | |
|---|---|---|
| JP | H07-064843 A | 3/1995 |

OTHER PUBLICATIONS

Tsuyoshi Tsuchii, "asp.net Web Form Application Development for Beginners, C#Compatible Version" First Edition, Japan, Shuwa System Co., Ltd., Nov. 20, 2015, pp. 286-305. (See the partial translation of the Office Action as a concise explanation of relevance).

(Continued)

*Primary Examiner* — Tyler J Torgrimson
(74) *Attorney, Agent, or Firm* — HEA Law PLLC

(57) ABSTRACT

Provided is a web database system, which allows concurrent editing operations of a web database through a plurality of interfaces, the web database system including at least one processor configured to: determine one of whether the web database has been edited through a first interface among the plurality of interfaces or whether the web database is being edited through the first interface; and execute predetermined processing relating to the web database for a second interface among the plurality of interfaces in one of a case in which it has been determined that the web database has been (Continued)

edited through the first interface or a case in which it has been determined that the web database is being edited through the first interface.

12 Claims, 14 Drawing Sheets

(56) References Cited

U.S. PATENT DOCUMENTS

| | | | | |
|---|---|---|---|---|
| 2014/0033101 | A1* | 1/2014 | Rein | G06F 16/2358 715/771 |
| 2014/0114912 | A1* | 4/2014 | Nair | G06F 40/197 707/608 |
| 2014/0223334 | A1* | 8/2014 | Jensen | H04L 65/403 715/753 |
| 2015/0379059 | A1* | 12/2015 | Schroetel | G06F 16/2358 707/690 |
| 2017/0061098 | A1* | 3/2017 | Holalkere | G16H 15/00 |
| 2018/0219923 | A1* | 8/2018 | Berger | G06Q 10/101 |
| 2020/0042584 | A1* | 2/2020 | Vennix | G06F 40/103 |
| 2020/0097504 | A1* | 3/2020 | Sequeda | G06F 16/367 |
| 2022/0222426 | A1* | 7/2022 | Zionpour | G06T 13/00 |
| 2023/0141680 | A1* | 5/2023 | Asgekar | G06V 40/28 345/156 |

OTHER PUBLICATIONS

Office Action of Jan. 16, 2024, for corresponding JP Patent Application No. 2022-184258 with partial translation, pp. 1-6.

"Is it possible for multiple users to simultaneously edit the same record?" the Internet, retrieved on Nov. 7, 2022, online, URL <https://jp.cybozu.help/k/ja/trouble_shooting/app_qa/edit_record_multiple_people.html>, pp. 1-2.

"Concurrent Editing and Merging Changes" the Internet, retrieved on Nov. 7, 2022, online, URL <https://ja.confluence.atlassian.com/doc/concurrent-editing-and-merging-changes-144719.html>, pp. 1-2.

Office Action of Jul. 2, 2024, for corresponding JP Patent Application No. 2022-184258 with partial English translation, pp. 1-6.

How to make the most of computer for fathers, File sharing edition, "Methods for sharing and transferring important data in a smart way!", Mr. PC, Japan, Shinyusha Co., Ltd., Jan. 24, 2020, vol. 11, No. 3, Issue 109, pp. 64-67 (See the Partial translation of the Office Action).

* cited by examiner

Figure 1:
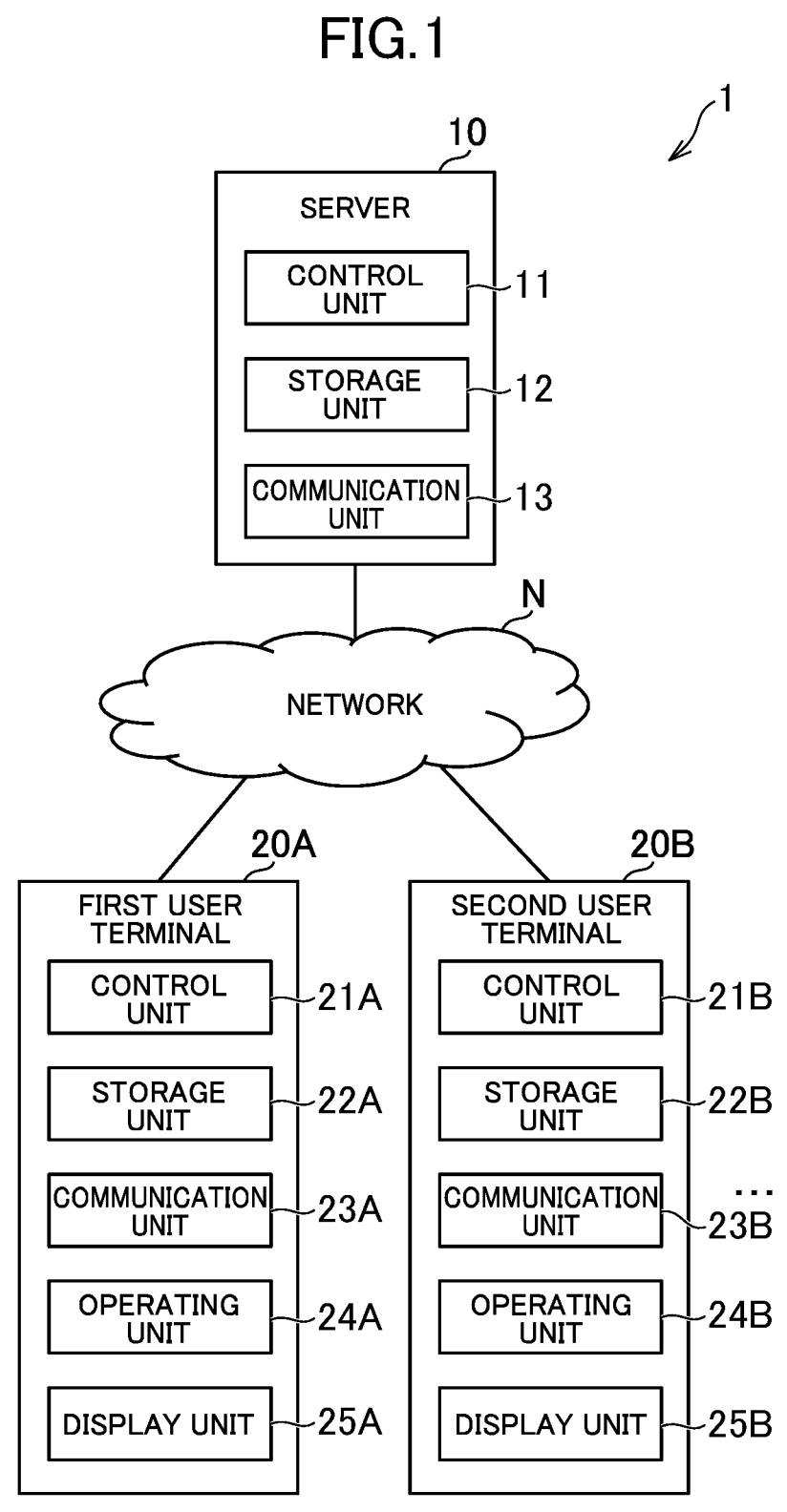

SERVER

CONTROL UNIT 11

STORAGE UNIT 12

COMMUNICATION UNIT 13

N

NETWORK

20A

FIRST USER TERMINAL

CONTROL UNIT 21A

STORAGE UNIT 22A

COMMUNICATION UNIT 23A

OPERATING UNIT 24A

DISPLAY UNIT 25A

20B

SECOND USER TERMINAL

CONTROL UNIT 21B

STORAGE UNIT 22B

COMMUNICATION UNIT 23B

OPERATING UNIT 24B

DISPLAY UNIT 25B

...

| | MANAGEMENT NUMBER | TITLE OF INVENTION | COUNTRY | APPLICATION TYPE | REQUEST DATE | FILING DATE |
|---|---|---|---|---|---|---|
| 10 | 1000 | INFORMATION PROCESSING SYSTEM | JP | PATENT | 2022/9/4 | 2022/10/10 |
| 3 | 1001 | DISPLAY CONTROL APPARATUS | JP | PATENT | 2022/9/8 | 2022/10/28 |
| 8 | 1002 | CLOUD SYSTEM | JP | PATENT | 2022/9/10 | 2022/10/15 |
| 12 | 1003 | DISPLAY IMAGE | JP | DESIGN | 2022/10/10 | – |
| 7 | 1004 | IMAGE PROCESSING SYSTEM | JP | PATENT | 2022/10/11 | – |

FIG.4

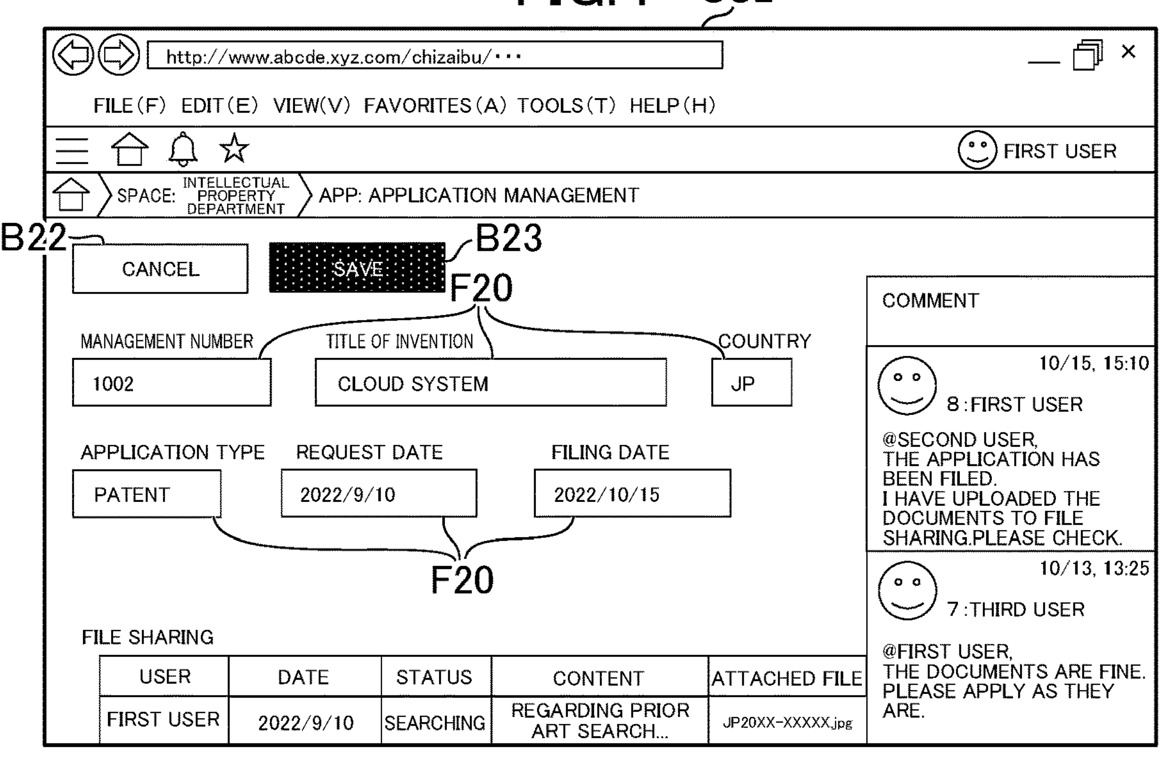
SC2
http://www.abcde.xyz.com/chizaibu/･･･
FILE(F) EDIT(E) VIEW(V) FAVORITES(A) TOOLS(T) HELP(H)
FIRST USER
SPACE: INTELLECTUAL PROPERTY DEPARTMENT
APP: APPLICATION MANAGEMENT
B22
CANCEL
SAVE
B23
F20
MANAGEMENT NUMBER
1002
TITLE OF INVENTION
CLOUD SYSTEM
COUNTRY
JP
APPLICATION TYPE
PATENT
REQUEST DATE
2022/9/10
FILING DATE
2022/10/15
F20
FILE SHARING
USER
DATE
STATUS
CONTENT
ATTACHED FILE
FIRST USER
2022/9/10
SEARCHING
REGARDING PRIOR ART SEARCH...
JP20XX-XXXXX.jpg
COMMENT
10/15, 15:10
8 : FIRST USER
@SECOND USER, THE APPLICATION HAS BEEN FILED. I HAVE UPLOADED THE DOCUMENTS TO FILE SHARING.PLEASE CHECK.
10/13, 13:25
7 : THIRD USER
@FIRST USER, THE DOCUMENTS ARE FINE. PLEASE APPLY AS THEY ARE.
PERFORM EDITING OPERATION BY FIRST USER

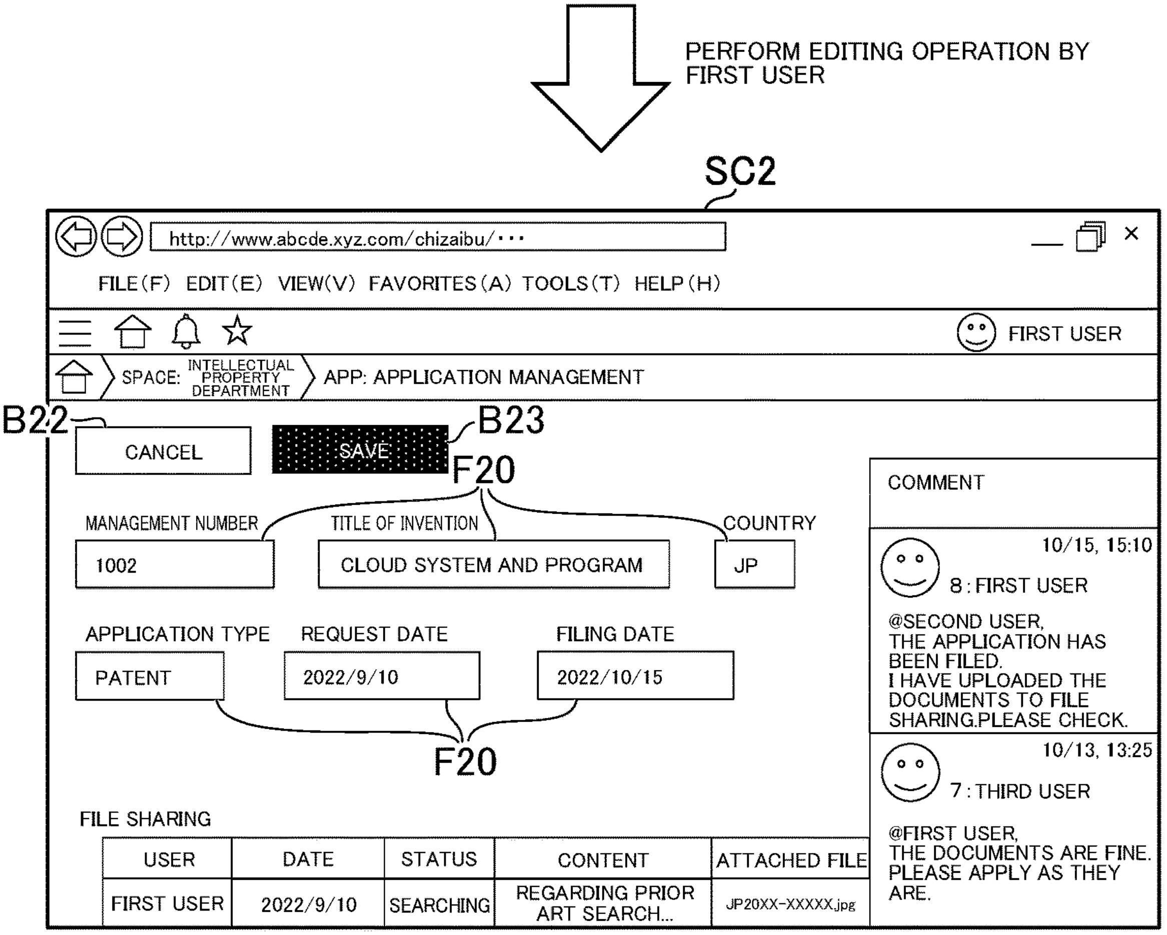
SC2
http://www.abcde.xyz.com/chizaibu/･･･
FILE(F) EDIT(E) VIEW(V) FAVORITES(A) TOOLS(T) HELP(H)
FIRST USER
SPACE: INTELLECTUAL PROPERTY DEPARTMENT
APP: APPLICATION MANAGEMENT
B22
CANCEL
SAVE
B23
F20
MANAGEMENT NUMBER
1002
TITLE OF INVENTION
CLOUD SYSTEM AND PROGRAM
COUNTRY
JP
APPLICATION TYPE
PATENT
REQUEST DATE
2022/9/10
FILING DATE
2022/10/15
F20
FILE SHARING
USER
DATE
STATUS
CONTENT
ATTACHED FILE
FIRST USER
2022/9/10
SEARCHING
REGARDING PRIOR ART SEARCH...
JP20XX-XXXXX.jpg
COMMENT
10/15, 15:10
8 : FIRST USER
@SECOND USER, THE APPLICATION HAS BEEN FILED. I HAVE UPLOADED THE DOCUMENTS TO FILE SHARING.PLEASE CHECK.
10/13, 13:25
7 : THIRD USER
@FIRST USER, THE DOCUMENTS ARE FINE. PLEASE APPLY AS THEY ARE.

FIG.6
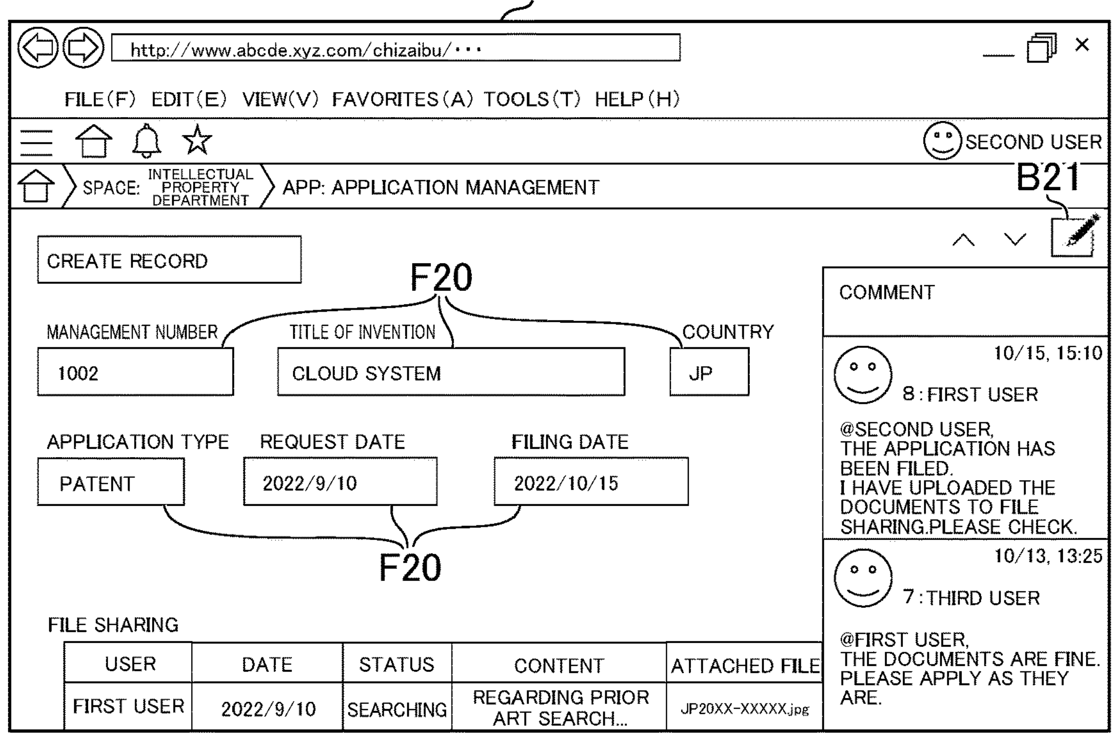
SELECT EDIT BUTTON BY SECOND USER AFTER EDITING BY FIRST USER
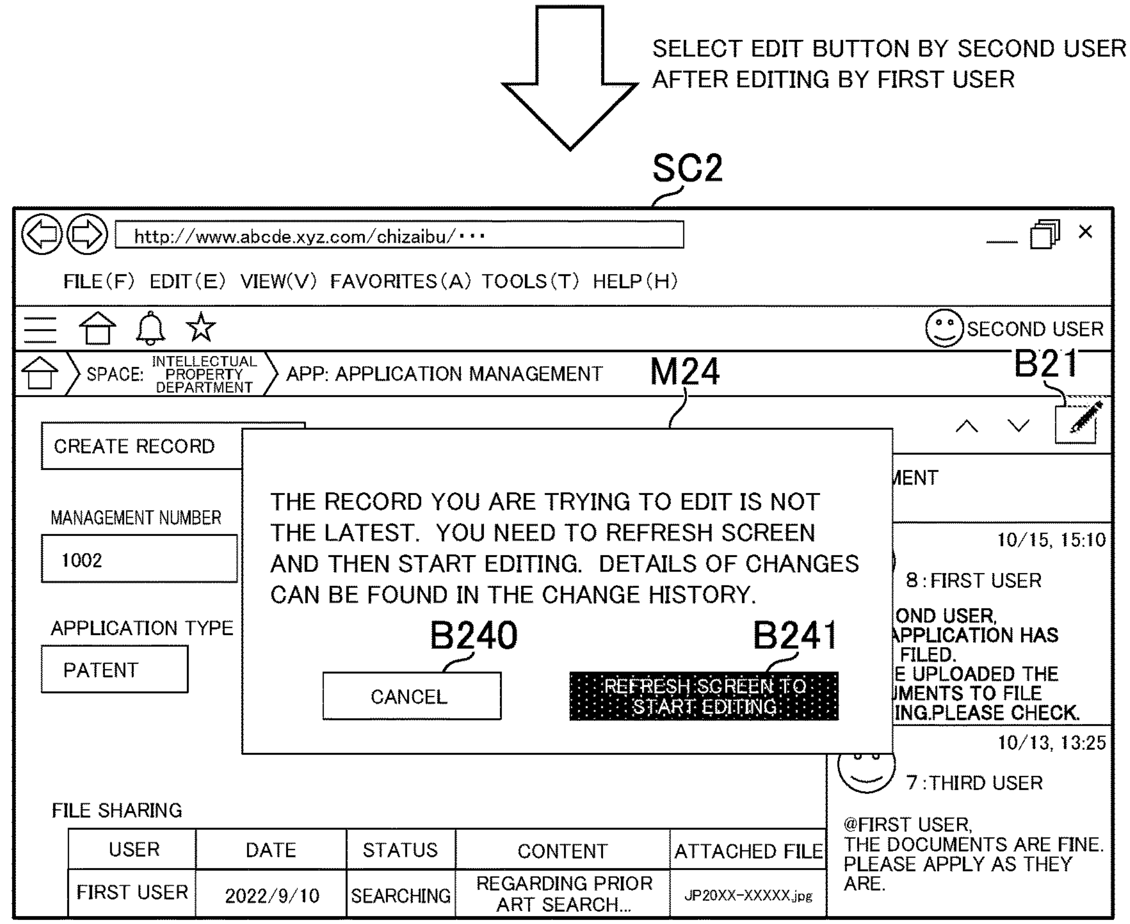

FIG.7
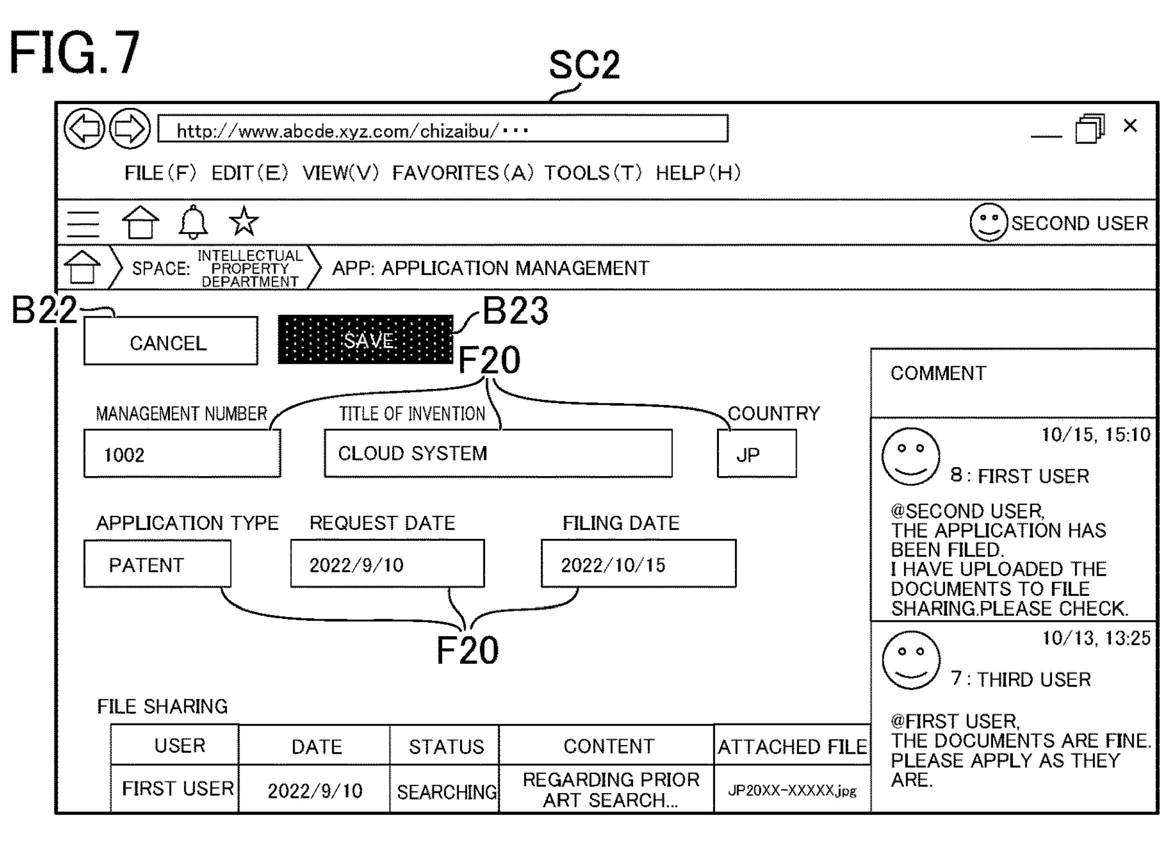
SELECT SAVE BUTTON BY SECOND USER AFTER EDITING BY FIRST USER
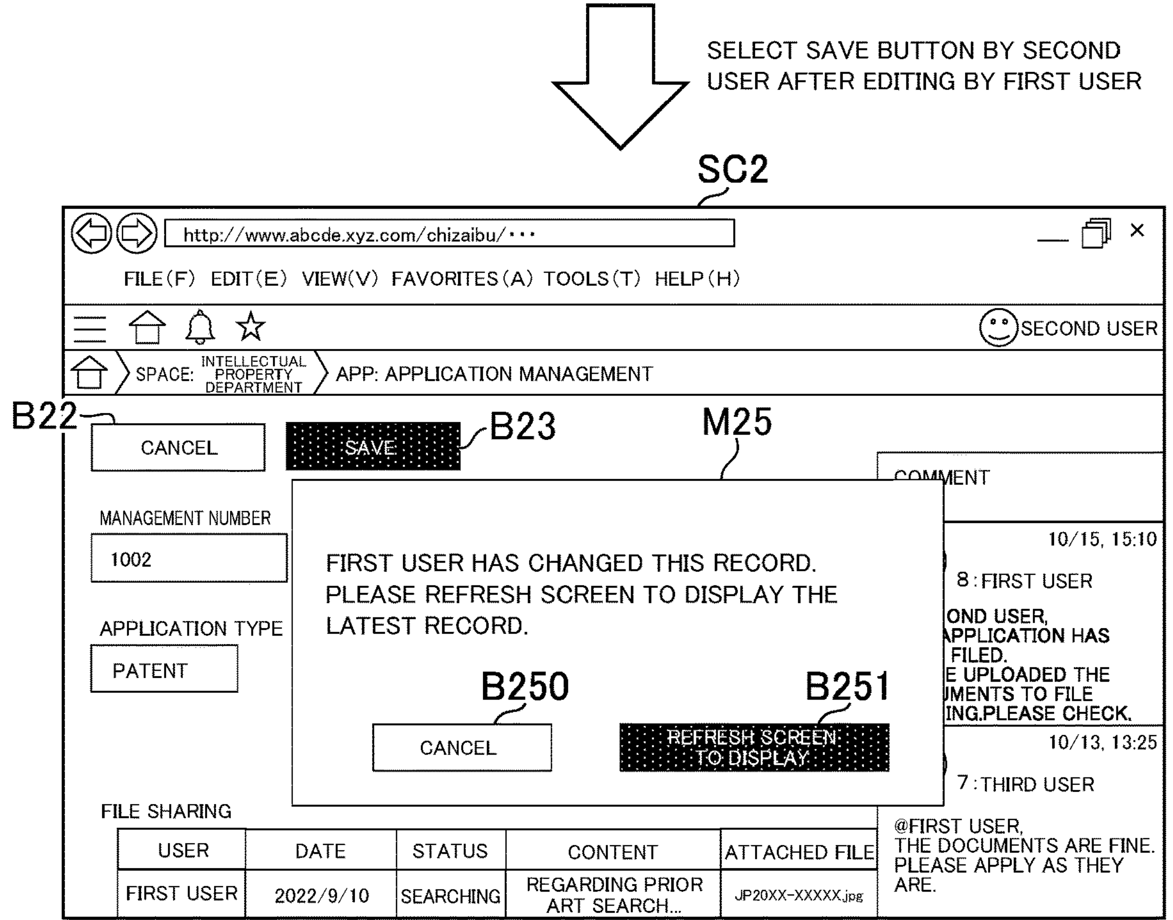

| WEB DATABASE NAME | RECORD DATA | | | | | | | | |
|---|---|---|---|---|---|---|---|---|---|
| | RECORD ID | MANAGEMENT NUMBER | TITLE OF INVENTION | COUNTRY | APPLICATION TYPE | REQUEST DATE | FILING DATE | ··· | VERSION INFORMATION |
| APPLICATION MANAGEMENT APP | 1 | 1000 | INFORMATION PROCESSING SYSTEM | JP | PATENT | 2022/9/4 | 2022/10/10 | ··· | 2022/11/7 13:25:46 |
| | 2 | 1001 | DISPLAY CONTROL APPARATUS | JP | PATENT | 2022/9/8 | 2022/10/28 | ··· | |
| | 3 | 1002 | CLOUD SYSTEM | JP | PATENT | 2022/9/10 | 2022/10/15 | ··· | |
| | 4 | 1003 | DISPLAY IMAGE | JP | DESIGN | 2022/10/10 | – | ··· | |
| | ⋮ | ⋮ | ⋮ | ⋮ | ⋮ | ⋮ | ⋮ | ⋮ | |

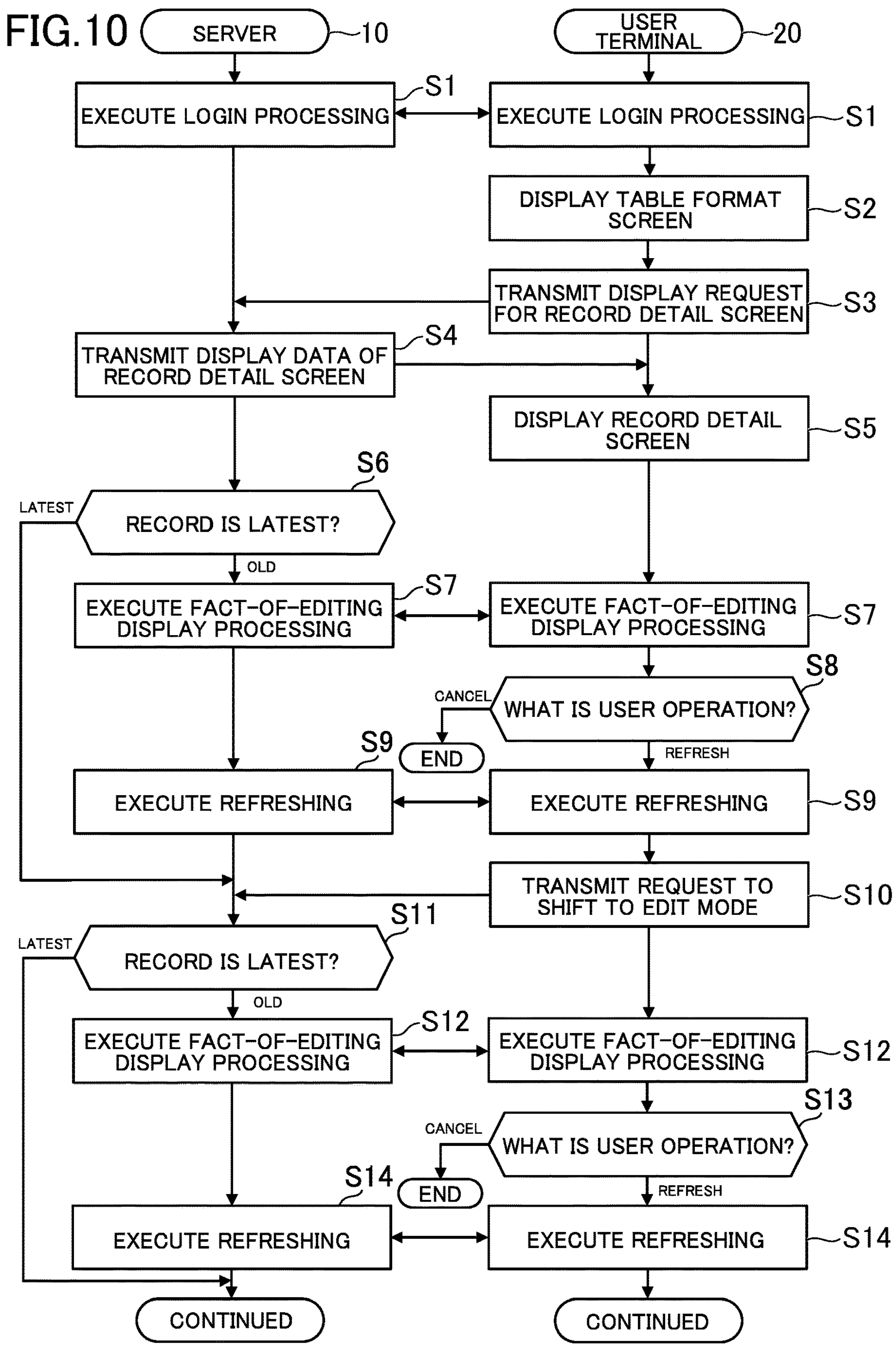
FIG.10
SERVER
10
USER TERMINAL
20
EXECUTE LOGIN PROCESSING
S1
EXECUTE LOGIN PROCESSING
S1
DISPLAY TABLE FORMAT SCREEN
S2
TRANSMIT DISPLAY REQUEST FOR RECORD DETAIL SCREEN
S3
TRANSMIT DISPLAY DATA OF RECORD DETAIL SCREEN
S4
DISPLAY RECORD DETAIL SCREEN
S5
S6
LATEST
RECORD IS LATEST?
OLD
EXECUTE FACT-OF-EDITING DISPLAY PROCESSING
S7
EXECUTE FACT-OF-EDITING DISPLAY PROCESSING
S7
S8
CANCEL
WHAT IS USER OPERATION?
END
REFRESH
S9
EXECUTE REFRESHING
EXECUTE REFRESHING
S9
TRANSMIT REQUEST TO SHIFT TO EDIT MODE
S10
S11
LATEST
RECORD IS LATEST?
OLD
EXECUTE FACT-OF-EDITING DISPLAY PROCESSING
S12
EXECUTE FACT-OF-EDITING DISPLAY PROCESSING
S12
S13
CANCEL
WHAT IS USER OPERATION?
END
REFRESH
S14
EXECUTE REFRESHING
EXECUTE REFRESHING
S14
CONTINUED
CONTINUED

FIG.12
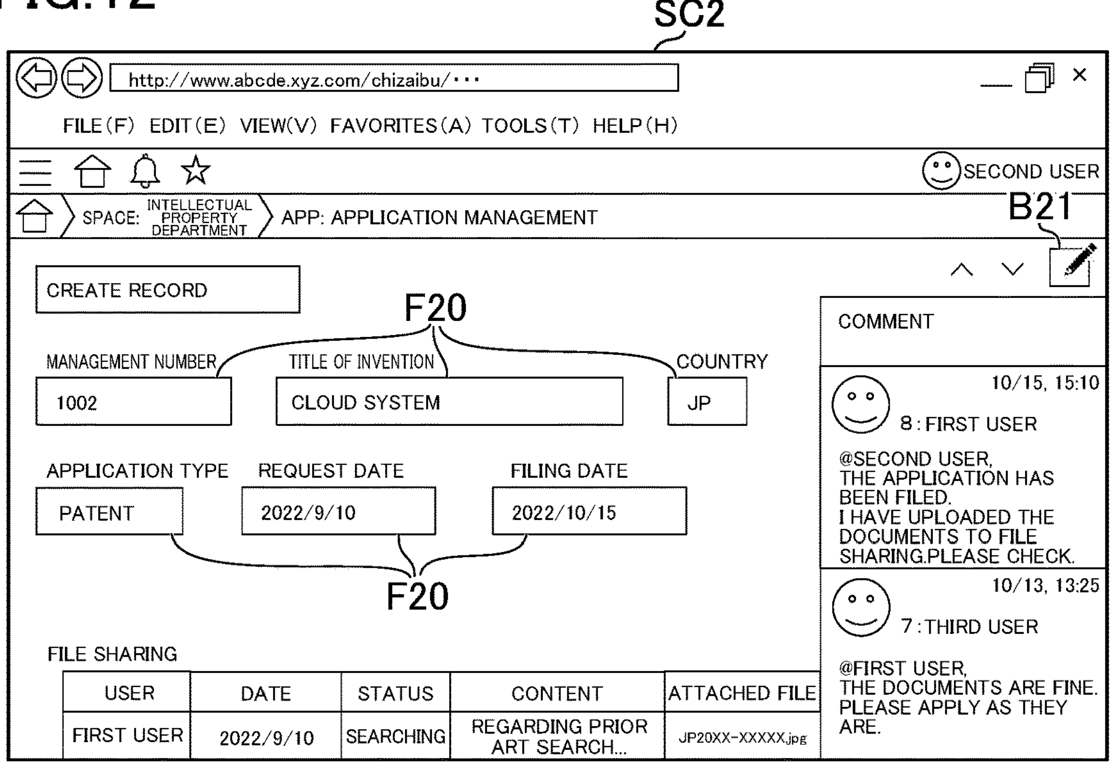
EDIT TITLE OF INVENTION BY FIRST USER DURING VIEW MODE ON SECOND USER SIDE
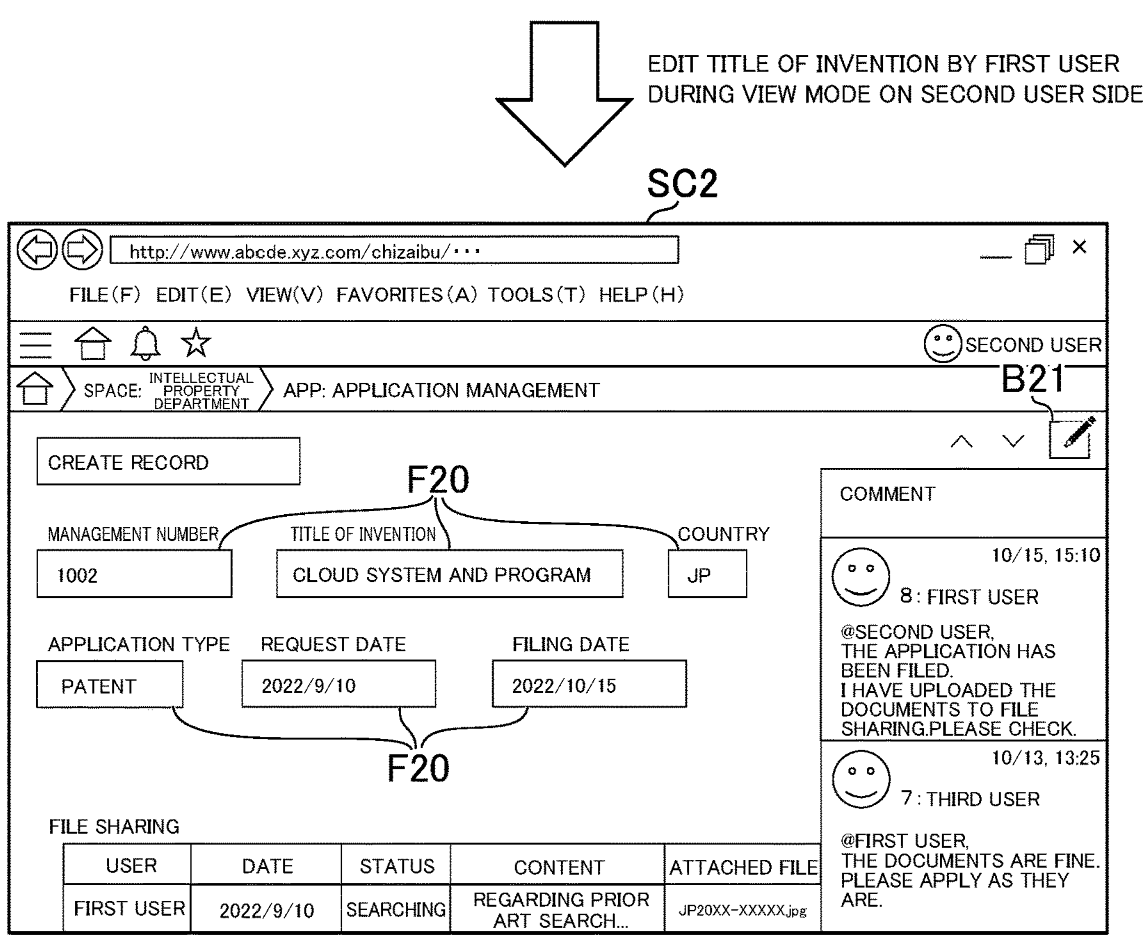

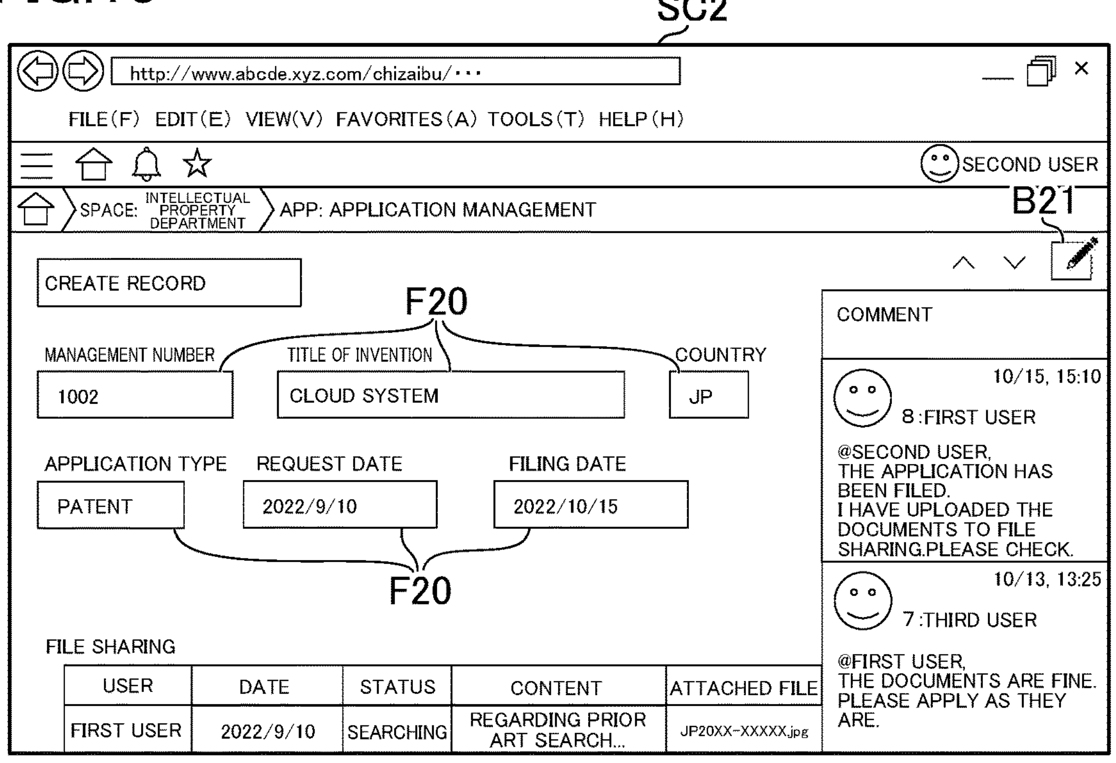
EDIT TITLE OF INVENTION BY FIRST USER DURING VIEW MODE ON SECOND USER SIDE
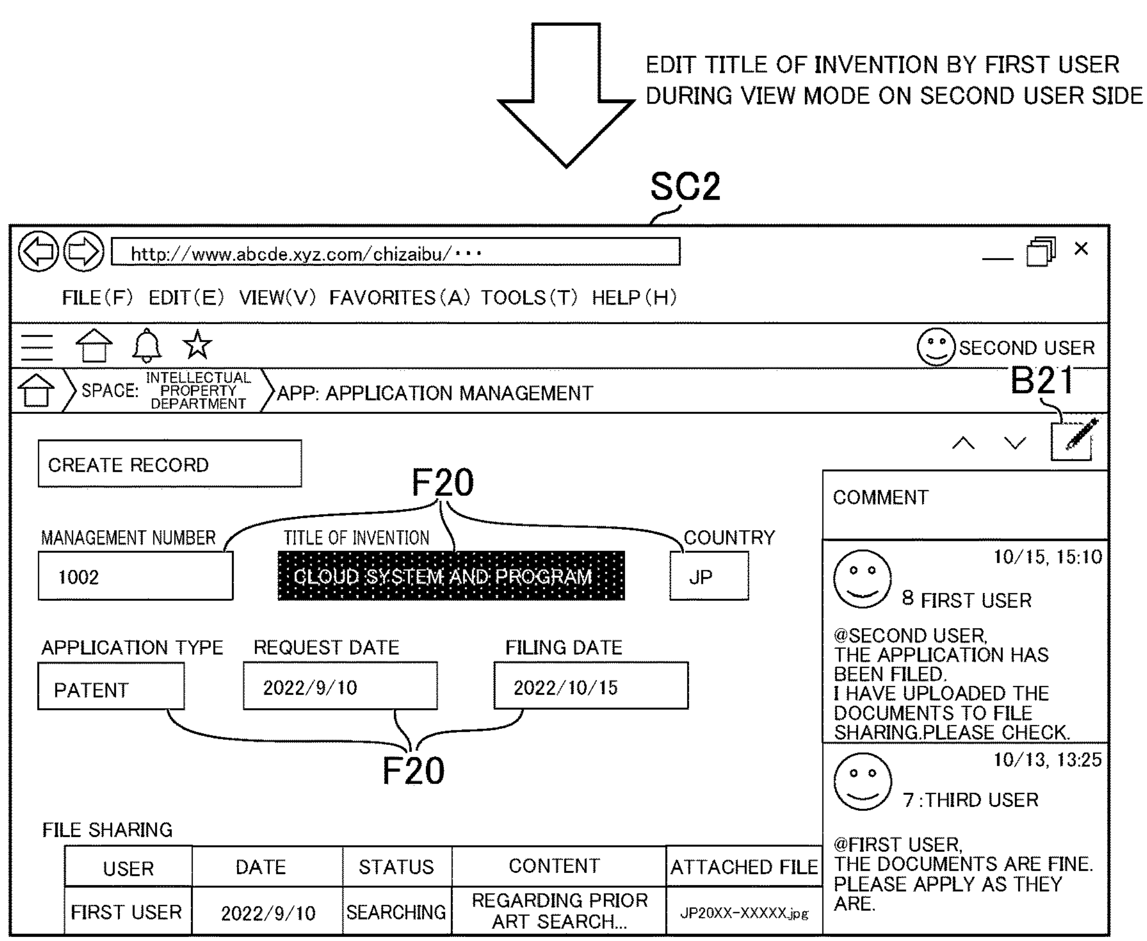

FIG.14

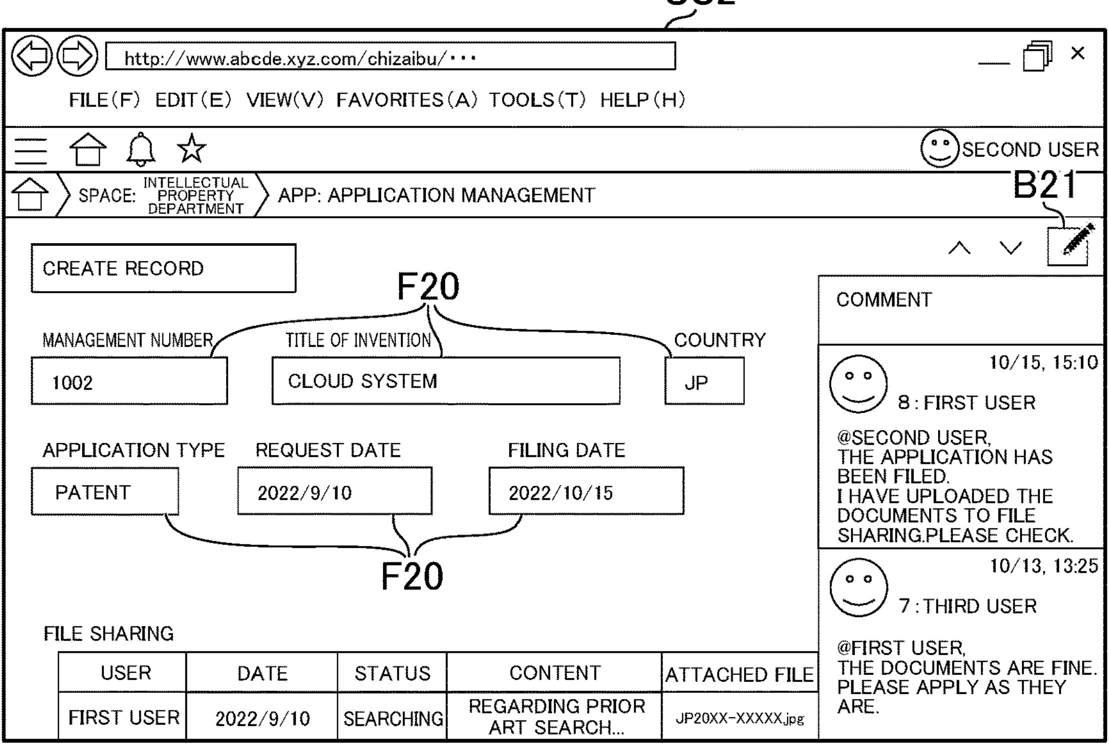
SC2
http://www.abcde.xyz.com/chizaibu/···
FILE(F) EDIT(E) VIEW(V) FAVORITES(A) TOOLS(T) HELP(H)
SECOND USER
SPACE: INTELLECTUAL PROPERTY DEPARTMENT
APP: APPLICATION MANAGEMENT
B21
CREATE RECORD
F20
MANAGEMENT NUMBER
1002
TITLE OF INVENTION
CLOUD SYSTEM
COUNTRY
JP
APPLICATION TYPE
PATENT
REQUEST DATE
2022/9/10
FILING DATE
2022/10/15
F20
FILE SHARING
USER
DATE
STATUS
CONTENT
ATTACHED FILE
FIRST USER
2022/9/10
SEARCHING
REGARDING PRIOR ART SEARCH...
JP20XX-XXXXX.jpg
COMMENT
10/15, 15:10
8 : FIRST USER
@SECOND USER, THE APPLICATION HAS BEEN FILED. I HAVE UPLOADED THE DOCUMENTS TO FILE SHARING.PLEASE CHECK.
10/13, 13:25
7 : THIRD USER
@FIRST USER, THE DOCUMENTS ARE FINE. PLEASE APPLY AS THEY ARE.
START EDITING BY FIRST USER DURING VIEW MODE ON SECOND USER SIDE

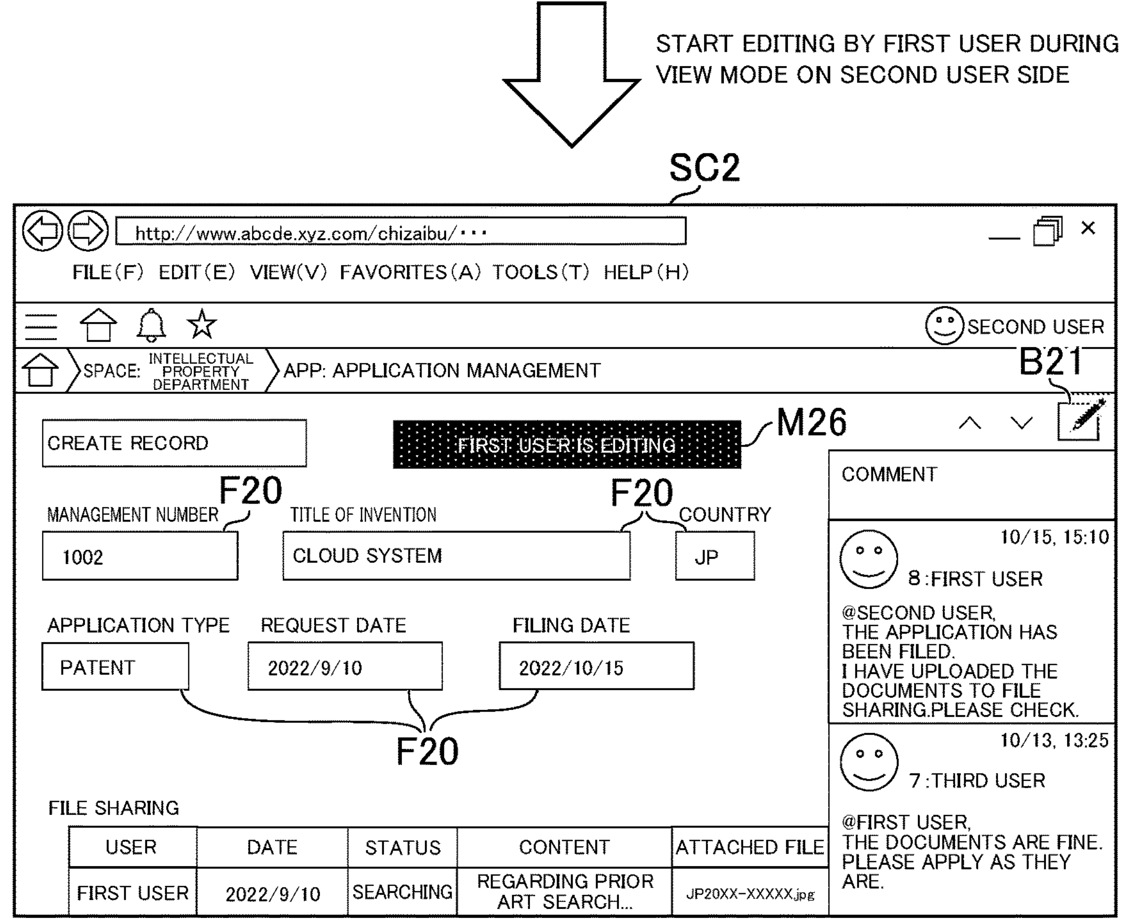
SC2
http://www.abcde.xyz.com/chizaibu/···
FILE(F) EDIT(E) VIEW(V) FAVORITES(A) TOOLS(T) HELP(H)
SECOND USER
SPACE: INTELLECTUAL PROPERTY DEPARTMENT
APP: APPLICATION MANAGEMENT
B21
CREATE RECORD
FIRST USER IS EDITING
M26
F20
MANAGEMENT NUMBER
1002
TITLE OF INVENTION
CLOUD SYSTEM
F20
COUNTRY
JP
APPLICATION TYPE
PATENT
REQUEST DATE
2022/9/10
FILING DATE
2022/10/15
F20
FILE SHARING
USER
DATE
STATUS
CONTENT
ATTACHED FILE
FIRST USER
2022/9/10
SEARCHING
REGARDING PRIOR ART SEARCH...
JP20XX-XXXXX.jpg
COMMENT
10/15, 15:10
8 :FIRST USER
@SECOND USER, THE APPLICATION HAS BEEN FILED. I HAVE UPLOADED THE DOCUMENTS TO FILE SHARING.PLEASE CHECK.
10/13, 13:25
7 :THIRD USER
@FIRST USER, THE DOCUMENTS ARE FINE. PLEASE APPLY AS THEY ARE.

WEB DATABASE SYSTEM, PROCESSING EXECUTION METHOD, AND INFORMATION STORAGE MEDIUM

CROSS-REFERENCE TO RELATED APPLICATION

The present disclosure contains subject matter related to that disclosed in Japanese Patent Application JP 2022-184258 filed in the Japan Patent Office on Nov. 17, 2022 the entire contents of which are hereby incorporated by reference.

BACKGROUND OF THE INVENTION

1. Field of the Invention

The present disclosure relates to a web database system, a processing execution method, and an information storage medium.

2. Description of the Related Art

Hitherto, there have been known web databases for which concurrent editing operations are allowed through a plurality of interfaces. For example, in "Is it possible for multiple users to simultaneously edit the same record?" (the Internet, retrieved on Nov. 7, 2022, online, https://jp.cybozu.help/k/ja/trouble_shooting/app_qa/edit_record_multiple_people.html), there is described a technology in which, when a record in a web database being edited by a user A is edited and saved by a user B and then the user A attempts to save the record, an error message that prompts the user A to refresh the page is displayed on a screen of the user A. For example, in "Concurrent Editing and Merging Changes" (the Internet, retrieved on Nov. 7, 2022, online, https://ja.confluence.atlassian.com/doc/concurrent-editing-and-merging-changes-144719.html), there is described a technology in which, while a user X is editing a web document, when a user Y edits the same web document, information that can identify a portion edited by the user Y is displayed on a screen of the user X.

However, with the technology as described in "Is it possible for multiple users to simultaneously edit the same record?," the user A is unable to notice the editing being performed by the user B until the error message is displayed. When the user A refreshes the page in accordance with the error message, edited content input by the user A so far is erased, and hence the user A is required to again input the edited content of a record. With the technology as described in "Concurrent Editing and Merging Changes," which does not relate to the editing of a web database in the first place, it is not possible to increase convenience of a web database. Accordingly, it has not been possible to sufficiently increase the convenience of a web database with the related-art technologies.

SUMMARY OF THE INVENTION

One object of the present disclosure is to increase convenience of a web database.

According to at least one aspect of the present disclosure, there is provided a web database system, which allows concurrent editing operations of a web database through a plurality of interfaces, the web database system including at least one processor configured to: determine one of whether the web database has been edited through a first interface among the plurality of interfaces or whether the web database is being edited through the first interface; and execute predetermined processing relating to the web database for a second interface among the plurality of interfaces in one of a case in which it has been determined that the web database has been edited through the first interface or a case in which it has been determined that the web database is being edited through the first interface.

BRIEF DESCRIPTION OF THE DRAWINGS

FIG. 1 is a diagram for illustrating an example of an overall configuration of a web database system.

FIG. 4 is a view for illustrating an example of an edit mode.

FIG. 6 is an example of the record detail screen on the second user side in an action pattern 1.

FIG. 7 is an example of the record detail screen on the second user side in an action pattern 2.

FIG. 9 is a table for showing an example of a web database.

FIG. 10 is a flow chart for illustrating an example of processing to be executed by the web database system.

FIG. 12 is a view for illustrating an example of automatic reflection processing.

FIG. 13 is a view for illustrating an example of edited part display processing.

FIG. 14 is a view for illustrating an example of fact-of-editing display processing.

DESCRIPTION OF THE EMBODIMENTS

Figure 2:
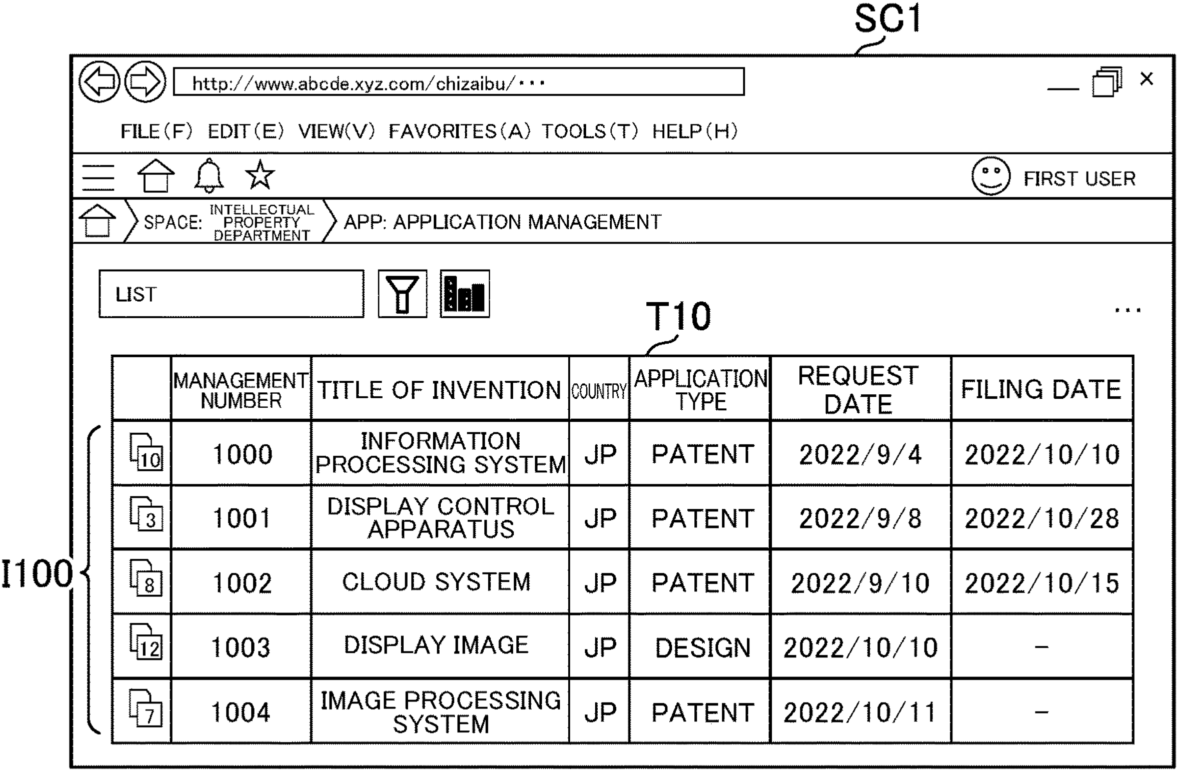
FIG. 2 is a view for illustrating an example of a table format screen.

1. Overall Configuration of Web Database System

An example of a web database system according to at least one embodiment of the present disclosure is described. FIG. 1 is a diagram for illustrating an example of an overall configuration of the web database system. For example, a web database system 1 includes a server 10, a first user terminal 20A, and a second user terminal 20B. The server 10, the first user terminal 20A, and the second user terminal 20B are each connected to a network N, such as the Internet or a LAN.

The server 10 is a server computer. For example, the server 10 includes a control unit 11, a storage unit 12, and a communication unit 13. The control unit 11 includes at least one processor. The storage unit 12 includes a volatile memory such as a RAM, and a non-volatile memory such as a flash memory. The communication unit 13 includes at least one of a communication interface for wired communication or a communication interface for wireless communication.

The first user terminal 20A is a computer of a first user. The second user terminal 20B is a computer of a second user different from the first user. In the following description, when the first user and the second user are not distinguished, the first user and the second user are simply referred to as "user." When the first user terminal 20A and the second user terminal 20B are not distinguished, the first user terminal 20A and the second user terminal 20B are simply referred to as "user terminal 20." When control units 21A and 21B, storage units 22A and 22B, communication units 23A and 23B, operating units 24A and 24B, and display units 25A and 25B are not distinguished, those units are simply referred to as "control unit 21," "storage unit 22," "communication unit 23," "operating unit 24," and "display unit 25," respectively.

For example, the user terminal 20 is a personal computer, a tablet terminal, or a smartphone. For example, the user terminal 20 includes the control unit 21, the storage unit 22, the communication unit 23, the operating unit 24, and the display unit 25. Hardware configurations of the control unit 21, the storage unit 22, and the communication unit 23 may be the same as those of the control unit 11, the storage unit 12, and the communication unit 13, respectively. The operating unit 24 is an input device, such as a mouse, a touch panel, or a keyboard. The display unit 25 is a liquid crystal display or an organic EL display.

Programs stored in the storage units 12 and 22 may be supplied through the network N. Hardware configurations of the server 10 and the user terminal 20 are not limited to the examples of FIG. 1. For example, a reading unit (for example, optical disc drive or memory card slot) for reading a computer-readable information storage medium or an input/output unit (for example, USB terminal) for directly connecting to an external device may be included. In this case, programs stored in the information storage medium may be supplied through intermediation of the reading unit or the input/output unit.

Further, the number of user terminals 20 may be any number, and is not limited to two. For example, the web database system 1 may include only one user terminal 20, or may include three or more user terminals 20. The number of users who use the web database system 1 may also be any number. For example, the number of users who use the web database system 1 may be one, or may be three or more. The number of users and the number of user terminals 20 may be the same, or may differ from each other. One user may use a plurality of user terminals 20, or one user terminal 20 may be shared by a plurality of users.

Further, the web database system 1 is only required to include at least one computer. The computers included in the web database system 1 are not limited to the example of FIG. 1. For example, the web database system 1 is not required to include the user terminal 20. In this case, the user terminal 20 is present outside the web database system 1, and the web database system 1 includes only the server 10. The web database system 1 may include the server 10 and another server computer. The web database system 1 may include only another computer other than the server computer.

2. Outline of Web Database System

The web database system 1 allows concurrent editing operations of a web database through a plurality of interfaces. The interface refers to means for receiving an editing operation. The interface as used herein is not limited to physical hardware, and means that a software user interface is also included. The interface as used in the at least one embodiment can be read as any interface for editing a web database.

In the at least one embodiment, a case in which the user terminal 20 corresponds to the interface is described, but the display unit 25 instead of the user terminal 20 may correspond to the interface. When the interface refers to a software user interface instead of physical hardware such as the user terminal 20 or the display unit 25, for example, a window of a browser, a tab within a window, or a screen of an application other than the browser corresponds to the interface. In the at least one embodiment, two interfaces are taken as an example, but three or more interfaces that allow concurrent editing operations may be employed.

The web database refers to a database that can be used through the network N. A computer that stores the web database and a computer that accesses the web database are different from each other. The web database is sometimes called "online database." In the at least one embodiment, a cloud-type web database is taken as an example, but various types of databases can be used for the web database itself. For example, the web database may be of an on-premises type.

The editing of the web database refers to updating all or a part of the web database. For example, when the web database includes at least one record, changing, deleting, or adding a record corresponds to the editing of the web database. When the web database does not have any concept of records, changing, deleting, or adding at least part of data that forms the web database corresponds to the editing of the web database. The editing operation is a user operation performed to edit the web database.

In the at least one embodiment, a case in which the web database system 1 is applied to a task support service is taken as an example. Examples of application to other services are described later in modification examples. The task support service is a service that supports an organization or an individual in tasks. A web database for a task support service is described below by taking screen transitions on the display unit 25A of the first user terminal 20A as an example. For example, when the first user logs in to the task support service, a table format screen for displaying the web database in a table format is displayed on the display unit 25A.

FIG. 2 is a view for illustrating an example of the table format screen. In the example of FIG. 2, a web database called "app" is taken as an example. The app is an example of a web database having a database function for registering, browsing, or searching data and a communication function for achieving smooth execution of tasks. In the example of FIG. 2, an app for managing applications to patent offices is described as the web database. For example, a table format screen SC1 displays a table T10 for showing a list of records in the web database.

The record is an individual unit of data that forms the web database. Pieces of data input to fields in the web database are grouped into one record. In the example of FIG. 2, a row of the table T10 corresponds to a record. A field is each of items that form a record. In the example of FIG. 2, a column of the table T10 corresponds to a field. For example, items such as "management number," "title of invention," "country," "application type," "request date," and "filing date" correspond to fields.

In the at least one embodiment, the record also includes other pieces of data that are not displayed in the table T10. The first user can select, from the table T10, a record having content to be examined in detail. In the example of FIG. 2, an icon I100 for selecting a record is displayed in the table T10. For example, when the first user selects the icon I100 for a record having a management number of "1002", a record detail screen showing details of this record is displayed on the display unit 25A.

Figure 3:
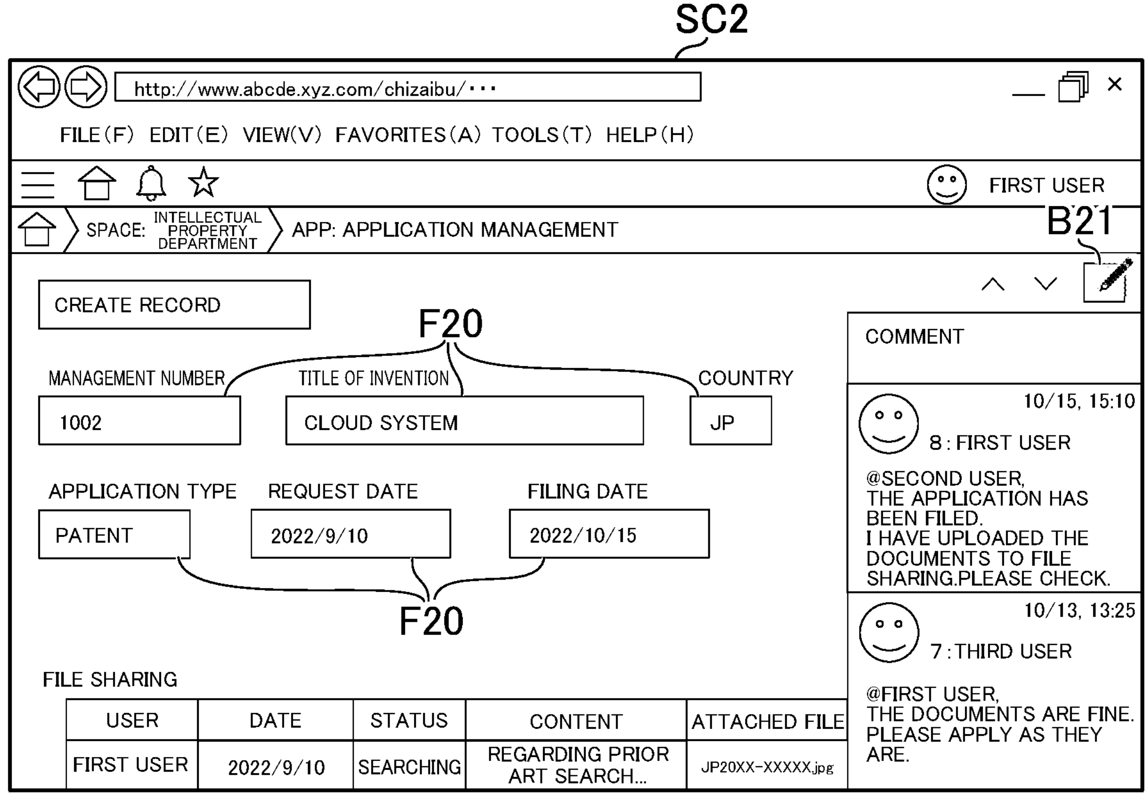
FIG. 3 is a view for illustrating an example of a record detail screen.

FIG. 3 is a view for illustrating an example of the record detail screen. For example, an input form F20 of a record detail screen SC2 displays values in fields of the record having the management number of "1002" selected by the first user. The record detail screen SC2 also displays other pieces of data that are not displayed in the table T10 of FIG. 2. In the example of FIG. 3, as the other pieces of data, a list of files registered in the record and comments registered in the record are displayed.

In the at least one embodiment, it is assumed that, in principle, the record cannot be edited unless the first user selects an edit button B21. However, it is assumed that a comment can be input even when the first user has not selected the edit button B21. In the following description, a state before the selection of the edit button B21 is referred to as "view mode." A state after the selection of the edit button B21 is referred to as "edit mode." For example, when the first user selects the edit button B21, the record detail screen SC2 shifts to the edit mode.

FIG. 4 is a view for illustrating an example of the edit mode. For example, in the edit mode, some images such as the edit button B21 are erased, and a cancel button B22 and a save button B23 are displayed. When the mode shifts to the edit mode, the first user can change the values in the input form F20 or upload a file to be shared. In the example of FIG. 4, the first user inputs "Cloud System and Program" as a new value to the field "title of invention" in the input form F20.

For example, the first user can also input edited content to a plurality of fields. When the first user selects the cancel button B22, the edit mode is canceled. When the edit mode is canceled, the edited content input so far is discarded. When the first user selects the save button B23, the record is edited based on the edited content input by the first user. In the example of FIG. 4, the value in the field "title of invention" becomes "Cloud System and Program." When the editing is completed, the mode returns from the edit mode to the view mode.

In FIG. 2 to FIG. 4, screen transitions on the display unit 25A are illustrated as examples, but the same screen transitions are possible on the display unit 25B. That is, in the same flow as in FIG. 2 to FIG. 4, the second user can also display the table format screen SC1 and the record detail screen SC2 on the display unit 25B to edit the record. In the at least one embodiment, the first user terminal 20A and the second user terminal 20B allow the concurrent editing operations of the same record, and hence the second user can also perform the editing operation on the same record as the record that has been edited or is being edited by the first user.

Figure 5:
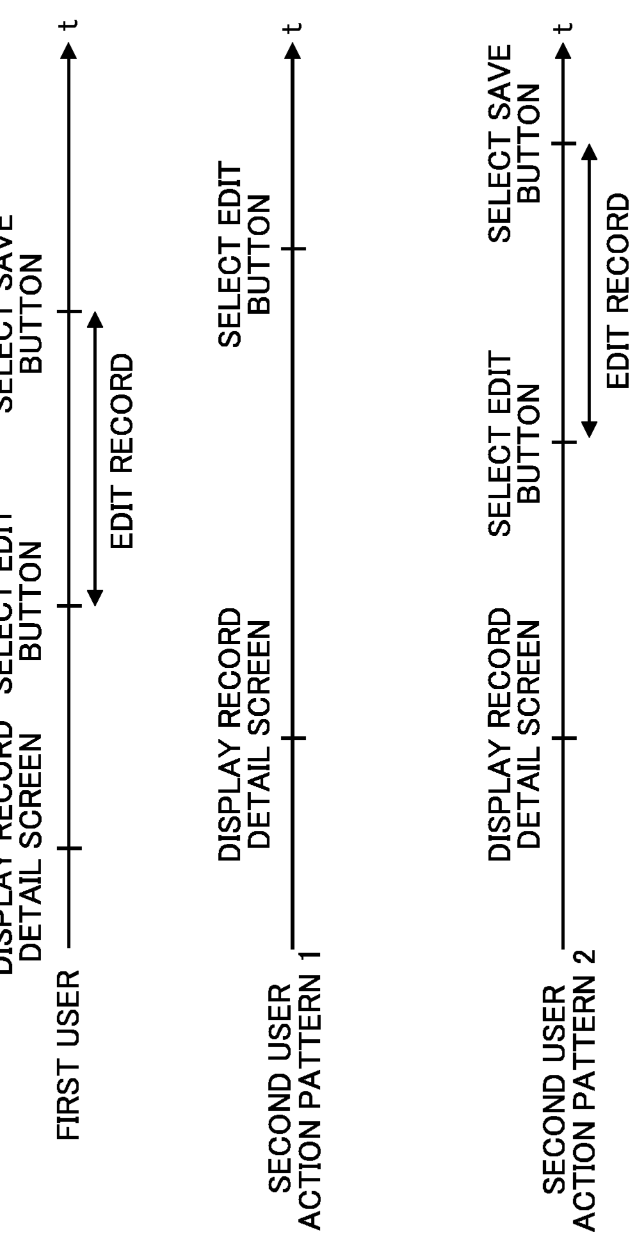
FIG. 5 is a chart for chronologically illustrating examples of respective actions taken by a first user and a second user.

FIG. 5 is a chart for chronologically illustrating examples of respective actions taken by the first user and the second user. In the example of FIG. 5, an action pattern in which the first user edits a record before the second user edits the record is illustrated. An action pattern in which the second user edits a record before the first user edits the record can be considered by replacing the first user and the second user in FIG. 5.

An action pattern 1 is an example of an action pattern in which the second user selects the edit button B21 to shift to the edit mode after the first user selects the save button B23. An action pattern 2 is an example of an action pattern in which the second user selects the edit button B21 to shift to the edit mode before the first user selects the save button B23. In the at least one embodiment, the display of the record detail screen SC2 on the second user side is different between the action pattern 1 and the action pattern 2.

FIG. 6 is an example of the record detail screen SC2 on the second user side in the action pattern 1. As illustrated in FIG. 6, in the case of the action pattern 1, when the second user selects the edit button B21 to attempt a shift to the edit mode, a message M24 that prompts refreshing is displayed on the second user terminal 20B. For example, the message M24 may include content that alerts the second user. The message M24 includes a cancel button B240 for canceling the shifting to the edit mode and a refresh button B241 for executing the refreshing.

For example, when the second user selects the cancel button B240, the message M24 is erased and the shift to the edit mode is canceled. In this case, the second user can also execute the refreshing from a menu of the browser or a predetermined key on the operating unit 24B. When the refreshing is executed, content edited by the first user is reflected in the record detail screen SC2. After that, when the second user selects the edit button B21, the record detail screen SC2 shifts to the edit mode without displaying the message M24.

For example, when the second user selects the refresh button B241, the record detail screen SC2 is refreshed and then the record detail screen SC2 in the edit mode is displayed on the display unit 25B. In this case, the content edited by the first user is reflected in the record detail screen SC2 in the edit mode. The second user can perform the editing operation from the record detail screen SC2 in the edit mode under a state in which the content edited by the first user has been reflected.

The message M24 may be displayed on the display unit 25B before the second user selects the edit button B21. For example, polling is periodically performed between the server 10 and the second user terminal 20B to detect the editing of a record by the first user. When the editing of a record by the first user is detected before the second user selects the edit button B21, the message M24 is displayed on the display unit 25B even without the selection of the edit button B21 by the second user. In this case, the second user can notice that the refreshing is required before selecting the edit button B21.

FIG. 7 is an example of the record detail screen SC2 on the second user side in the action pattern 2. As illustrated in FIG. 7, in the case of the action pattern 2, the editing by the first user has not been completed at a time point at which the record detail screen SC2 shifts to the edit mode. The editing by the first user has been completed by a time point at which the second user selects the save button B23, and hence a message M25 that prompts refreshing is displayed on the second user terminal 20B. For example, the message M25 may include a notification for the second user instead of an alert.

In the example of FIG. 7, the message M25 is the same as the message M24 in that a cancel button B250 and a refresh button B251 are included, but specific wording is different from the message M24. For example, the name of the first user is displayed in the message M25, but is not displayed in the message M24. For example, the message M24 mentions a change history of a record, while the message M25 does not mention a change history of a record. Other wording also differs between the messages M24 and M25.

For example, when the second user selects the cancel button B250, the message M25 is erased and the screen returns to the record detail screen SC2 immediately before the selection of the save button B23. In this case, the second user can also execute the refreshing from a menu of the browser or a predetermined key on the operating unit 24B. When the refreshing is executed, content edited by the first user is reflected in the record detail screen SC2.

The edited content input by the second user before the refreshing may be inherited by the record detail screen SC2 after the refreshing, or the second user may save the edited content in a text editor or the like, without having the edited content inherited, and copy and paste the edited content after the refreshing. After that, when the second user selects the save button B23, the record is edited based on the content edited by the second user without displaying the message M25. When the second user edits the same field as that edited by the first user, the content edited by the first user is overwritten by the content edited by the second user.

For example, when the second user selects the refresh button B251, the record detail screen SC2 is refreshed. In this case as well, the edited content input by the second user before the refreshing may be held in the server 10 or the second user terminal 20B and inherited by the record detail screen SC2 after the refreshing, or the second user may save the edited content in a text editor or the like, without particularly having the edited content inherited, and copy and paste the edited content after the refreshing. After that, when the second user selects the save button B23, the record is edited based on the content edited by the second user without displaying the message M25.

In the same manner as in the message M24, the message M25 may be displayed on the display unit 25B before the second user selects the save button B23. In this case as well, polling may be periodically performed between the server 10 and the second user terminal 20B. When the editing of a record by the first user is detected before the second user selects the save button B23, the message M25 is displayed on the display unit 25B without the selection of the save button B23 by the second user. In this case, the second user can notice that the refreshing is required before selecting the save button B23.

As described above, while the second user is viewing or editing a record, when the first user edits the same record, the web database system 1 displays the message M24 or M25 on the record detail screen SC2 on the second user side. This allows the second user to notice that the refreshing is required at an early stage, thereby increasing convenience of the web database. The web database system 1 is now described in more detail below.

3. Functions Implemented by Web Database System

Figure 8:
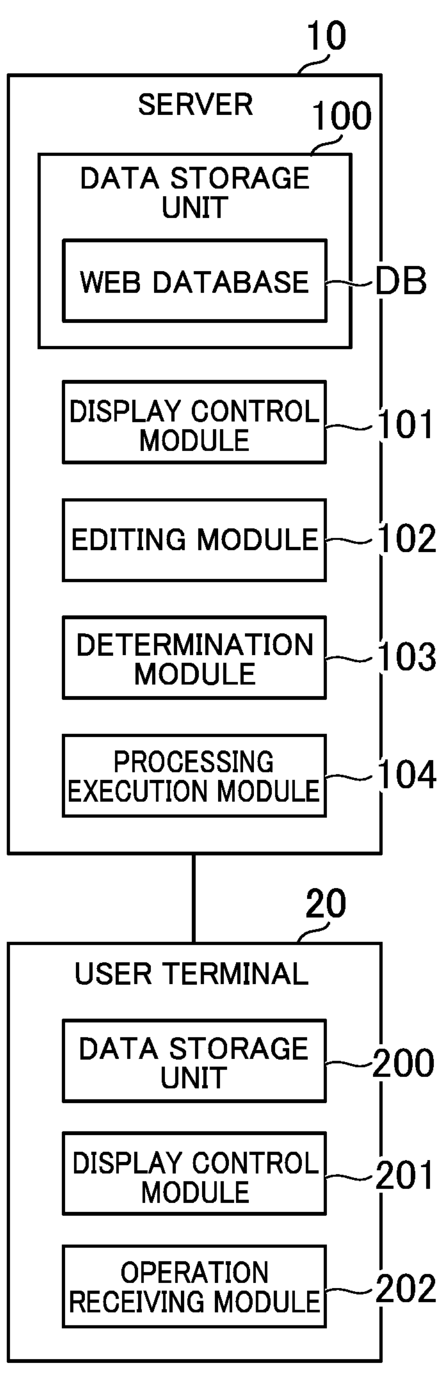
FIG. 8 is a diagram n for illustrating an example of functions implemented by the web database system.

FIG. 8 is a diagram n for illustrating an example of functions implemented by the web database system 1.

3-1. Functions Implemented by Server

The server 10 includes a data storage unit 100, a display control module 101, an editing module 102, a determination module 103, and a processing execution module 104. The data storage unit 100 is implemented by the storage unit 12. The display control module 101, the editing module 102, the determination module 103, and the processing execution module 104 are implemented by the control unit 11.

[Data Storage Unit]

The data storage unit 100 stores at least one web database DB. In the at least one embodiment, only one web database DB is described for the sake of simplification of description, but the data storage unit 100 may store a plurality of web databases DB.

FIG. 9 is a table for showing an example of the web database DB. For example, the web database DB stores a database name and record data relating to a record. The database name is information that can identify the web database DB. The web database DB may be identified by other information such as a link instead of the database name. The web database DB may store any data, and the data stored in the web database DB is not limited to the example shown in FIG. 9. For example, the web database DB may store data on the change history of the record or data on access authority.

The record data is data relating to each record. For example, the record data includes a record ID that can uniquely identify a record, data to be displayed in the table T10, and data that is not to be displayed in the table T10. For example, the data to be displayed in the table T10 includes a name of each of a plurality of fields and a value in each of the fields. For example, the data that is not to be displayed in the table T10 includes a file registered in the record and a comment registered in the record. In the at least one embodiment, the record data includes version information on the record. For example, the version information indicates the latest edit date and time of the record.

The version information is not limited to the latest edit date and time as long as the version information is information that can identify whether or not the record is the latest. For example, the version information may also be a value that is incremented or decremented each time editing is performed. When the record detail screen SC2 is displayed on the user terminal 20, the version information is also transmitted to the user terminal 20. A match between the version information held on the server 10 side and the version information held on the user terminal 20 side indicates that the record displayed on the record detail screen SC2 is the latest. A mismatch therebetween indicates that the record displayed on the record detail screen SC2 is not the latest.

The version information may be present for each individual portion that forms the record. For example, the version information may be present for each field of the record. This enables specific identification of which portion of the record has been updated. In addition to the version information, the record data may include editor information that can identify a user who has edited the record. The editor information may also be present for each individual portion that forms the record. This enables specific identification of who has updated which portion of the record.

Further, the data storage unit 100 can store any data. The data stored in the data storage unit 100 is not limited to the web database DB. For example, the data storage unit 100 stores a user database in which information on users who use the task support service is stored. For example, the user database stores data such as a user ID that can identify a user, a name of the user, a password, an organization of the user, a job title of the user, and an affiliation of the user. For example, the data storage unit 100 stores data required for displaying various screens such as the table format screen SC1 and the record detail screen SC2.

[Display Control Module]

The display control module 101 displays, on the user terminal 20, a screen showing all or part of the content of the web database DB. In the at least one embodiment, the record detail screen SC2 is described as an example of this screen, but all or a part of the web database DB may be displayed on the table format screen SC1 or another screen. For example, another screen may be a screen for displaying all or part of the content of the web database DB in a format other than the table format or a screen for collectively displaying details of a plurality of records. It may be possible to edit the web database DB from another screen.

For example, the display control module 101 generates display data of the record detail screen SC2, and transmits the display data to the user terminal 20. The display data may be any data that is required for displaying some kind of screen, and may have any format. In the at least one embodiment, the browser is used, and hence HTML data is described as an example of the display data. The display data may be XML data, image data such as JPG, or data having another format. When an application dedicated to the task support service is used instead of the browser, data for displaying some kind of screen in the application may correspond to the display data.

For example, when the user selects the icon I100 on the table format screen SC1, the user terminal 20 transmits a display request for the record detail screen SC2 to the server 10. The display request may be any data that has a predetermined format for displaying the record detail screen SC2, and includes, for example, a URL corresponding to the record detail screen SC2. The display request also includes record identification information that can identify the record selected by the user. It is assumed that the record identification information is included in the display data of the table format screen SC1. For example, the record ID assigned to the record may correspond to the record identification information, or a value in the field such as the management number of FIG. 2 may correspond to the record identification information.

For example, when the server 10 receives the display request for the record detail screen SC2, the display control module 101 acquires the record data corresponding to the record identification information included in the display request from the web database DB. The display control module 101 generates display data of the record detail screen SC2 based on the acquired record data. It is assumed that the display data also includes the version information on the record. For example, the display control module 101 sets, in the input form F20, the value in each field included in the record data.

In the at least one embodiment, at a time point immediately after the record detail screen SC2 has just been displayed, the mode is not the edit mode but the view mode, and hence the input form F20 has an attribute of "disabled" so that no values can be input. The display control module 101 displays the record detail screen SC2 in the view mode on the user terminal 20 by transmitting, to the user terminal 20, the display data in which other portions except comments are also set to the attribute of "disabled." When the view mode and the edit mode are not to be selectively used, the attribute of "disabled" may not be set.

For example, when the user selects the edit button B21 on the record detail screen SC2, the user terminal 20 transmits a request to shift to the edit mode to the server 10. The shift request may be any data that has a predetermined format for instructing for a shift from the view mode to the edit mode, and includes, for example, a URL in which information indicating that a shift to the edit mode has been instructed and the version information on the record displayed on the record detail screen SC2 are indicated as arguments. When the edit button B21 is selected, the mode may be shifted to the edit mode only by control on the user terminal 20 side without the transmission of the shift request from the user terminal 20 to the server 10. In this case, a change from the attribute of "disabled" to an attribute of "enabled," which is described later, is also executed only by the control on the user terminal 20 side.

For example, when the server 10 receives the request to shift to the edit mode, determination is executed by the determination module 103 described later. When the message M24 is not required to be displayed by the processing execution module 104 described later, the display control module 101 generates display data of the record detail screen SC2 in the edit mode, and displays the display data on the user terminal 20. On the record detail screen SC2 in the edit mode, the input form F20 and the like, which had the attribute of "disabled" in the view mode, are now set to the attribute of "enabled." Similarly when the user selects the save button B23, determination is executed by the determination module 103 described later, and when the message M24 is not required to be displayed by the processing execution module 104 described later, the display control module 101 generates display data of the record detail screen SC2 in the view mode, in which edits have been reflected, and displays the display data on the user terminal 20.

[Editing Module]

The editing module 102 edits the web database DB based on an operation performed by the user. In the at least one embodiment, editing can be performed in units of records, and hence the editing module 102 edits, based on the user operation, a record designated by the user from the web database DB. For example, when the user selects the edit button B21 to set the record detail screen SC2 to the edit mode, the editing module 102 edits the record based on the edited content input by the user from the record detail screen SC2 in the edit mode. As a record editing method itself, a publicly known method can be used. As an editing method itself that does not involve editing in units of records, a publicly known method can be used as well. It suffices that the editing module 102 edits the web database DB based on a request received from the user terminal 20. After having edited the web database DB, the editing module 102 updates the version information.

[Determination Module]

The determination module 103 determines whether or not the web database DB has been edited or is being edited through a first interface among the plurality of interfaces. The wording "been edited" means that the editing operation has been performed and the saving of the edited content has been completed. The wording "being edited" means that the editing operation is in progress and the saving of the edited content has not yet been completed. In the at least one embodiment, the editing is performed in units of records, and hence the determination module 103 determines whether or not the same record as a record being displayed or being edited through a second interface in the web database DB has been edited or is being edited through the first interface. In the at least one embodiment, a case in which the determination module 103 determines whether or not the web database DB has been edited through the first interface without execution of determination of whether or not the record is being edited is described. The determination of whether or not the record is being edited is described later in the modification examples.

In the at least one embodiment, the first user terminal 20A and the second user terminal 20B are described as examples of the first interface and the second interface, respectively. For example, when the first user selects the save button B23, the first user terminal 20A transmits a save request for saving the edited content of the record to the server 10. The save request may be any data that has a predetermined format, and includes, for example, the edited content of the record. The determination module 103 determines whether or not the save request has been received from the first user terminal 20A, to thereby determine whether or not the web database DB has been edited by the first user terminal 20A.

In the example of FIG. 4, the save request includes the text of "Cloud System and Program," which is the value in the field "title of invention" input by the first user. The save request may include data of portions of the record that have not been edited by the first user. The editing module 102 described above edits the record in the web database DB based on the save request. After that, the determination module 103 may execute polling with respect to the second user terminal 20B. The polling in the at least one embodiment means checking the version information rather than achieving data consistency.

The determination module 103 may determine whether the version information on the record stored in the web database DB and the version information on the record stored in the second user terminal 20B match each other. The determination module 103 may determine whether or not, instead of the version information, the value in each field of the record stored in the web database DB and the value in each field of the record being displayed on the record detail screen SC2 match each other. The determination module 103 determines whether or not the record displayed on the record detail screen SC2 on the second user side is the latest. The fact that the record is not the latest means that the record has been edited by the first user.

[Processing Execution Module]

When it is determined that the web database DB has been edited or is being edited through the first interface, the processing 104 executes predetermined execution module processing relating to the web database DB for the second interface among the plurality of interfaces. In the at least one embodiment, the editing is performed in units of records, and hence the processing execution module 104 executes the predetermined processing when it is determined that the same record has been edited or is being edited through the first interface.

In the at least one embodiment, a case in which the processing execution module 104 executes the predetermined processing based on the content edited through the first interface while the web database DB is being displayed on the second interface is described, but the predetermined processing may be executed while the web database DB is not being displayed on the second interface. For example, the predetermined processing may be executed while a screen corresponding to the second interface is minimized and is not being displayed, while the screen is powered off, or while the screen is locked. The predetermined processing may also be executed irrespective of the edited content in the first interface.

In the example of FIG. 2 to FIG. 7, the first user terminal 20A corresponds to the first interface, and the second user terminal 20B corresponds to the second interface. Thus, when it is determined that the web database DB has been edited or is being edited through the first user terminal 20A, the processing execution module 104 executes the predetermined processing relating to the web database DB for the second user terminal 20B.

The predetermined processing is processing that is executed when it is determined that the web database DB has been edited or is being edited through the first interface. In the at least one embodiment, when it is determined that the web database DB is being edited or has been edited through the first interface, the processing execution module 104 executes, as the predetermined processing, fact-of-editing display processing for displaying, on the second interface, information that can identify that the web database DB is being edited or has been edited through the first interface. Thus, the fact-of-editing display processing as used herein can be read as the predetermined processing.

In the at least one embodiment, a case in which the fact-of-editing display processing is processing for displaying, on the second interface, information that can identify that the web database DB has been edited through the first interface is described. For example, the fact-of-editing display processing is processing for displaying the message M24 or M25. The fact-of-editing display processing may be processing for displaying an image other than the message M24 or M25. For example, the fact-of-editing display processing may be executed through use of a notification within the task support service, a push notification for the user terminal 20, a pop-up, an electronic mail, or another messaging tool. In the fact-of-editing display processing, it is not required to display an image for refreshing, such as the refresh button B241 or B251, and the fact-of-editing display processing may be processing for simply displaying only an image showing that the web database DB has been edited in some way.

In the at least one embodiment, the processing execution module 104 executes the fact-of-editing display processing based on a status regarding the web database DB on the second interface. The status as used herein means whether the web database DB has not been edited or is being edited. A degree to which the editing has been performed by the second user may correspond to the status. The processing execution module 104 may execute the fact-of-editing display processing in a specific status without executing the fact-of-editing display processing in a certain status. In the at least one embodiment, the processing execution module 104 executes the fact-of-editing display processing so that a different image is displayed depending on the status.

For example, before the second user selects the edit button B21 (that is, before shifting to the edit mode), the processing execution module 104 executes the fact-of-editing display processing for displaying the message M24. After the second user selects the edit button B21 (that is, after shifting to the edit mode), the processing execution module 104 executes the fact-of-editing display processing for displaying the message M25. It suffices that the processing execution module 104 changes the image between before the second user selects the edit button B21 and after the second user selects the edit button B21, and the processing execution module 104 may change a notification method itself instead of selectively using the messages M24 and M25.

3-2. Functions Implemented by User Terminal

The first user terminal 20A and the second user terminal 20B have the same function. Thus, functions of the user terminal 20 are described without distinguishing between the first user terminal 20A and the second user terminal 20B. The user terminal 20 includes a data storage unit 200, a display control module 201, and an operation receiving module 202. The data storage unit 200 is implemented by the storage unit 22. The display control module 201 and the operation receiving module 202 are implemented by the control unit 21.

[Data Storage Unit]

The data storage unit 200 stores data required for editing the web database DB. For example, the data storage unit 200 stores a browser for displaying various screens relating to a task support service. For example, the data storage unit 200 stores an application for the task support service.

[Display Control Module]

The display control module 201 displays various screens for the task support service on the display unit 25. For example, the display control module 201 displays the table format screen SC1 or the record detail screen SC2 on the display unit 25 based on the display data received from the server 10.

[Operation Receiving Module]

The operation receiving module 202 receives various operations in the task support service. Details of the operation are transmitted to the server 10 as appropriate.

4. Processing to be Executed by Web Database System

Figure 11:
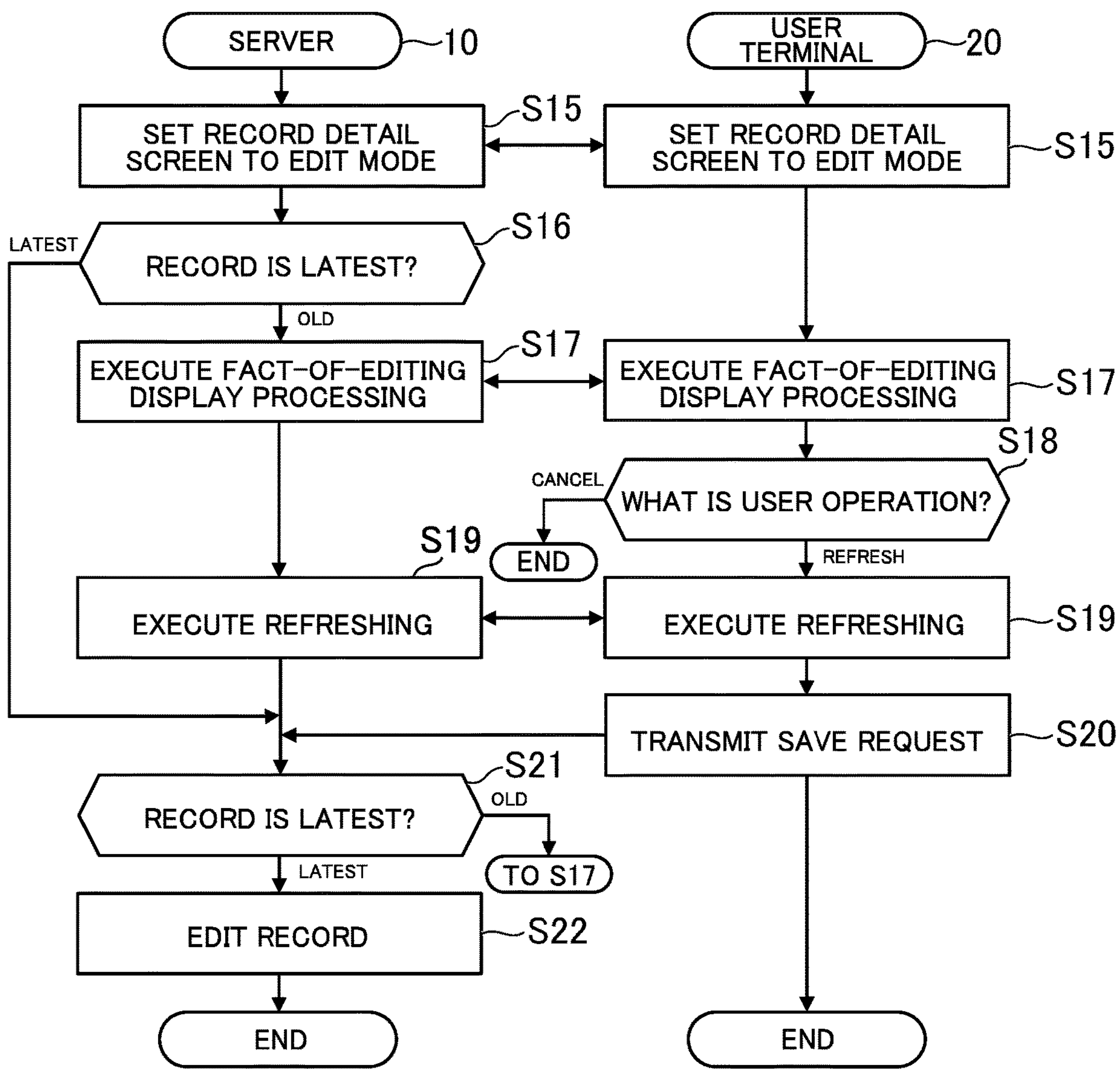
FIG. 11 is a flow chart for illustrating an example of the processing to be executed by the web database system.

FIG. 10 and FIG. 11 are flow charts for illustrating an example of processing to be executed by the web database system 1. In FIG. 10 and FIG. 11, the processing is described as being executed by the user terminal 20 without distinguishing between the first user terminal 20A and the second user terminal 20B.

As illustrated in FIG. 10, the user terminal 20 cooperates with the server 10 to execute login processing for logging in to the task support service (Step S1). When the login is successful and the user requests display of the web database DB, the user terminal 20 displays the table format screen SC1 on the display unit 25 (Step S2). When the user selects the icon I100, the user terminal 20 transmits a display request for the record detail screen SC2 to the server 10 (Step S3).

When the server 10 receives the display request for the record detail screen SC2, the server 10 generates display data of the record detail screen SC2 in the view mode based on the web database DB, and transmits the display data to the user terminal 20 (Step S4). This display data includes the version information on the record that is the object of the display request. When the user terminal 20 receives the display data of the record detail screen SC2, the user terminal 20 displays the record detail screen SC2 in the view mode on the display unit 25 (Step S5).

The server 10 acquires the version information from the user terminal 20, and determines whether or not the record displayed on the record detail screen SC2 is the latest (Step S6). In Step S6, the server 10 acquires the version information from the user terminal 20 at regular time intervals (for example, about 0.5 second to several seconds or about 10 seconds to 30 seconds). In Step S6, when the server 10 determines that the record displayed on the record detail screen SC2 is the latest ("latest" in Step S6), the process proceeds to the processing step of Step S10 described later, and the processing steps of Step S7 to Step S9 are not executed.

In Step S6, when it is determined that the record displayed on the record detail screen SC2 is not the latest ("old" in Step S6), the server 10 cooperates with the user terminal 20 to execute the fact-of-editing display processing for displaying the message M24 (Step S7). The user terminal 20 identifies the user operation (Step S8). When the user selects the refresh button B241 ("refresh" in Step S8), the user terminal 20 cooperates with the server 10 to execute the refreshing (Step S9). When the user selects the cancel button B240 ("cancel" in Step S8), the message M24 is erased, and this processing ends. In this case, when the user performs the refreshing by another method, Step S10 and the subsequent processing may be executed.

When the user selects the edit button B21, the user terminal 20 transmits a request to shift to the edit mode to the server 10 (Step S10). When the server 10 receives the request to shift to the edit mode, the server 10 determines whether or not the record displayed on the record detail screen SC2 is the latest based on the web database DB (Step S11). The processing step of Step S11 is the same as the processing step of Step S6. When it is determined that the record displayed on the record detail screen SC2 is the latest ("latest" in Step S11), the process proceeds to the processing step of Step S15 described later, and the processing steps of Step S12 to Step S14 are not executed.

In Step S11, when it is determined that the record displayed on the record detail screen SC2 is not the latest ("old" in Step S11), the same processing steps of Step S12 to Step S14 as Step S7 to Step S9 are executed. When the refreshing is executed in Step S14, the process proceeds to Step S15. Referring now to FIG. 11, the user terminal 20 cooperates with the server 10 to set the record detail screen SC2 to the edit mode (Step S15). When the mode shifts to the edit mode in Step S15, the user is allowed to perform an editing operation. The user performs input and the like on the input form F20.

The server 10 executes the same processing step of Step S16 as the processing step of Step S6. When it is determined that the record displayed on the record detail screen SC2 is the latest ("latest" in Step S16), the process proceeds to the processing step of Step S20 described later, and the processing steps of Step S17 to Step S19 are not executed. In Step S16, when it is determined that the record displayed on the record detail screen SC2 is not the latest ("old" in Step S16), the server 10 cooperates with the user terminal 20 to execute the fact-of-editing display processing for displaying the message M25 (Step S17).

The user terminal 20 identifies the user operation (Step S18). When the user selects the refresh button B251 ("refresh" in Step S18), the user terminal 20 cooperates with the server 10 to execute the refreshing (Step S19). When the user selects the cancel button B250 ("cancel" in Step S18), the processing step of Step S19 is not executed, and this processing ends. In this case, when the user performs the refreshing by another method, Step S20 and the subsequent processing may be executed.

When the user selects the save button B23, the user terminal 20 transmits a save request to the server 10 (Step S20). When the server 10 receives the save request, the server 10 determines whether or not the record displayed on the record detail screen SC2 is the latest based on the web database DB (Step S21). The processing step of Step S21 is the same as the processing step of Step S16. When it is determined that the record displayed on the record detail screen SC2 is the latest ("latest" in Step S21), the server 10 edits the record based on the save request (Step S22), and ends this processing. When it is determined in Step S21 that the record displayed on the record detail screen SC2 is not the latest ("old" in Step S21), the processing steps of Step S17 to Step S19 are executed.

The web database system 1 according to the at least one embodiment executes predetermined processing relating to the web database DB for the second interface when it is determined that the web database DB has been edited or is being edited through the first interface. This increases the convenience of the web database DB. For example, when the web database DB is edited through the first user terminal 20A, the message M24 or M25 is displayed on the second user terminal 20B, to thereby allow the second user to notice that the refreshing is required at an early stage. As a result, the edited content is prevented from being wasted by an error message displayed when the second user selects the save button B23, thereby increasing the convenience of the web database DB. For example, when the web database DB is being edited through the first user terminal 20A, displaying a similar message on the second user terminal 20B also allows the second user to notice that the refreshing is required at an early stage. Thus, the edited content input by the second user is prevented from being wasted, thereby increasing the convenience of the web database DB.

Further, the web database system 1 executes the predetermined processing based on the content edited through the first interface when the web database DB is being displayed on the second interface. This increases the convenience of the web database DB. For example, when the record detail screen SC2 is being displayed on the second user terminal 20B, the message M24 or M25 is displayed, to thereby allow the second user to notice that the refreshing is required while examining the record detail screen SC2. This increases the convenience.

Further, database the web system 1 executes the predetermined processing when it is determined that the same record as the record being displayed on or edited through the second interface has been edited or is being edited through the first interface. The data to be subjected to the determination by the determination module 103 is handled in units of records, thereby increasing the convenience of the web database DB. For example, when the first user edits a first record and the second user edits a second record, the refreshing is not required, and hence the message M24 or M25 is inhibited from being displayed. Meanwhile, only when the refreshing is required, the message M24 or M25 is displayed. This can prevent unrequired display.

Further, when it is determined that the web database DB has been edited through the first interface, the web database system 1 executes, as the predetermined processing, the fact-of-editing display processing for displaying, on the second interface, the information that can identify that the web database DB has been edited through the first interface. With this information, it becomes easier for the second interface to allow the user to notice that the web database DB has been edited through the first interface, thereby increasing the convenience of the web database DB. For example, the message M24 or M25 is displayed as this information, to thereby allow the second user to notice that the refreshing is required at an early stage. This increases the convenience of the web database DB.

Further, the web database system 1 executes the fact-of-editing display processing based on the status regarding the web database DB on the second interface. This enables flexible display depending on the status, thereby increasing the convenience of the web database DB. For example, it is possible to give the second user a notice corresponding to the status by selectively using the display in such a manner as to display the message M24 before the second user starts to edit the record and display the message M25 when the second user is editing the record.

5. Modification Examples

The present disclosure is not limited to the example of the at least one embodiment described above, and can be modified suitably without departing from the spirit of the present disclosure.

5-1. Modification Example 1

For example, in the example described in the at least one embodiment, even when the first user and the second user edit the same record, the first user and the second user may edit mutually different portions. In this case, even when the second user edits the record without refreshing and noticing the editing performed by the first user, the content edited by the first user is not to be overwritten, and hence the message M25 may be inhibited from being displayed.

The processing execution module 104 in Modification Example 1 executes, when the web database DB has been edited or is being edited through the second interface as well, the predetermined processing based on the content edited through the first interface and the content edited through the second interface. In Modification Example 1, in the same manner as in the at least one embodiment, the first user terminal 20A, the second user terminal 20B, and the fact-of-editing display processing are described as examples of the first interface, the second interface, and the predetermined processing, respectively. As described in the at least one embodiment, the first interface, the second interface, and the predetermined processing are not limited to those examples.

For example, the processing execution module 104 determines whether or not a part of the record edited by the first user and a part of the record edited by the second user match each other. The edited part is a field of a record or another portion (for example, comment or file sharing portion) other than the field. The processing execution module 104 does not execute the fact-of-editing display processing when it is determined that the part of the record edited by the first user and the part of the record edited by the second user do not match each other, and executes the fact-of-editing display processing when it is determined that the part of the record edited by the first user and the part of the record edited by the second user match each other. The processing execution module 104 may change the content of the message M24 or the like based on a result of the determination described above instead of determining whether or not to execute the fact-of-editing display processing.

The processing to be executed by the processing execution module 104 is not limited to the examples described above. For example, even when the first user and the second user edit the same part of the same record, the edited content may be the same. In this case, even when the second user does not execute the refreshing, the content edited by the first user is not substantially overwritten, and hence it can be unrequired to display the message M25 on the second user terminal 20B.

Accordingly, when it is determined that the part of the record edited by the first user and the part of the record edited by the second user match each other, the processing execution module 104 may further determine whether or not the value input by the first user and the value input by the second user are the same. The processing execution module 104 may not execute the fact-of-editing display processing when it is determined that the value input by the first user and the value input by the second user are the same, and may execute the fact-of-editing display processing when it is determined that the value input by the first user and the value input by the second user are not the same.

The web database system 1 according to Modification Example 1 executes, when the web database DB has been edited or is being edited through the second interface as well, the predetermined processing based on the content edited through the first interface and the content edited through the second interface. Accordingly, the predetermined processing can be flexibly executed, thereby increasing the convenience of the web database DB. For example, the second user is not required to perform the refreshing, and hence a burden on the second user is reduced.

5-2. Modification Example 2

For example, in the at least one embodiment, the fact-of-editing display processing has been described as an example of the predetermined processing to be executed by the processing execution module 104. The predetermined processing may be any processing that is executed based on a result of the determination performed by the determination module 103, and is not limited to the fact-of-editing display processing. In Modification Example 2, another example of the predetermined processing is described.

The processing execution module 104 in Modification Example 2 executes, as the predetermined processing, automatic reflection processing for automatically reflecting the content edited through the first interface in the second interface. The automatic reflection processing is processing for displaying the content edited through the first interface in the second interface without requiring an operation on the second interface. The automatic reflection processing is executed through execution of the polling for achieving record consistency between the server 10 and the user terminal 20. Polling may be executed through use of a program such as a script on the browser. In Modification Example 2, in the same manner as in the at least one embodiment, the first user terminal 20A and the second user terminal 20B are described as examples of the first interface and the second interface, respectively. As described in the at least one embodiment, the first interface and the second interface are not limited to those examples.

FIG. 12 is a view for illustrating an example of the automatic reflection processing. In the example of FIG. 12, the record detail screen SC2 in the view mode is displayed on the second user terminal 20B. When the first user edits the record in this case, the processing execution module 104 executes the automatic reflection processing by automatically changing the value in the record edited by the first user to the value input by the first user on the record detail screen SC2 in the view mode. In this case, a message indicating that the automatic reflection processing has been executed may be displayed on the record detail screen SC2.

When the record detail screen SC2 in the edit mode is displayed on the second user terminal 20B, the processing execution module 104 may also execute the same automatic reflection processing as that of FIG. 12. For example, when the first user edits the record, the processing execution module 104 may execute the automatic reflection processing by automatically changing the value in the field edited by the first user to the value input by the first user on the record detail screen SC2 in the edit mode.

Further, through combination of Modification Examples 1 and 2, the processing execution module 104 may execute the automatic reflection processing based on the content edited by the first user and the content edited by the second user. For example, the processing execution module 104 may not execute the automatic reflection processing when it is determined that the part of the record edited by the first user and the part of the record edited by the second user match each other, and may execute the automatic reflection processing when it is determined that the part of the record edited by the first user and the part of the record edited by the second user do not match each other.

For example, through combination of Modification Examples 1 and 2, the processing execution module 104 may not execute the automatic reflection processing when it is determined that the value input by the first user and the value input by the second user are not the same, and may execute the automatic reflection processing when it is determined that the value input by the first user and the value input by the second user are the same. The processing execution module 104 may execute the fact-of-editing display processing together with the automatic reflection processing, or may not execute the fact-of-editing display processing when executing the automatic reflection processing. The processing execution module 104 may not execute the fact-of-editing display processing irrespective of whether or not the automatic reflection processing is executed.

The web database system 1 according to Modification Example 2 executes the automatic reflection processing as the predetermined processing. Accordingly, the edited content is automatically reflected without execution of the refreshing, thereby increasing the convenience of the web database DB.

5-3. Modification Example 3

For example, the processing execution module 104 may execute, as the predetermined processing, processing other than the fact-of-editing display processing and the automatic reflection processing. The processing execution module 104 in Modification Example 3 executes, as the predetermined processing, edited part display processing for displaying the part edited through the first interface so as to be identifiable on the second interface. In Modification Example 3, in the same manner as in the at least one embodiment, the first user terminal 20A and the second user terminal 20B are described as examples of the first interface and the second interface, respectively. As described in the at least one embodiment, the first interface and the second interface are not limited to those examples.

FIG. 13 is a view for illustrating an example of the edited part display processing. In the example of FIG. 13, the record detail screen SC2 in the view mode is displayed on the second user terminal 20B. When the first user edits the record in this case, the processing execution module 104 executes the edited part display processing by changing a background color of the field edited by the first user in the input form F20 on the record detail screen SC2 in the view mode. In FIG. 13, a case in which the automatic reflection processing in Modification Example 2 is executed and the edited part display processing is also executed is illustrated, but only the edited part display processing may be executed without execution of the automatic reflection processing in Modification Example 2.

The edited part display processing is not limited to the example of FIG. 13 as long as the edited part display processing is processing for allowing visual recognition of the edited part. For example, changing a frame color instead of the background of the field in the input form F20, increasing a size of the field in the input form F20, displaying an image such as a dialogue balloon near the field in the input form F20, or changing a color of the value in the field in the input form F20 may correspond to the edited part display processing. The processing execution module 104 may execute the edited part display processing by executing those plurality of processing examples in combination.

Further, when the record detail screen SC2 in the edit mode is displayed on the second user terminal 20B, the processing execution module 104 may also execute the same edited part display processing as that of FIG. 13. For example, when the first user edits the record, the processing execution module 104 may execute the edited part display processing by changing the background color of the field edited by the first user in the input form F20 on the record detail screen SC2 in the edit mode.

Further, through combination of Modification Examples 1 and 3, the processing execution module 104 may execute the edited part display processing based on the content edited by the first user and the content edited by the second user. Through combination of Modification Examples 2 and 3, the processing execution module 104 may execute the automatic reflection processing together with the edited part display processing. Through combination of Modification Examples 1 to 3, the processing execution module 104 may execute the fact-of-editing display processing and the automatic reflection processing together with the edited part display processing.

The web database system 1 according to Modification Example 3 executes, as the predetermined processing, the edited part display processing for displaying the part edited through the first interface so as to be identifiable on the second interface.

Accordingly, it becomes easier to notice the edited part, thereby increasing the convenience of the web database DB.

5-4. Modification Example 4

For example, in the at least one embodiment and Modification Examples 1 to 3, the cases in which the processing execution module 104 executes the predetermined processing when the record has been edited by the first user have been described. The processing execution module 104 may execute the predetermined processing on condition that the record is being edited by the first user. That is, the processing execution module 104 may execute the predetermined processing before the editing of the record by the first user is completed.

The determination module 103 in Modification Example 4 determines whether or not the web database DB is being edited through the first interface. When it is determined that the web database DB is being edited through the first interface, the processing execution module 104 executes, as the predetermined processing, the fact-of-editing display processing for displaying, on the second interface, information that can identify that the web database DB is being edited through the first interface. In Modification Example 3, in the same manner as in the at least one embodiment, the first user terminal 20A and the second user terminal 20B are described as examples of the first interface and the second interface, respectively.

For example, the determination module 103 does not determine that the web database DB is being edited when an edit request has not been received from the first user terminal 20A, and determines that the web database DB is being edited when the edit request is received from the first user terminal 20A. In Modified Example 4, a case in which the determination module 103 also executes processing for identifying the first user who is editing the web database DB is described, but the determination module 103 is not required to identify who is editing the web database DB.

FIG. 14 is a view for illustrating an example of the fact-of-editing display processing. In the example of FIG. 14, the record detail screen SC2 in the view mode is displayed on the second user terminal 20B. When the first user starts the editing of the record in this case, the processing execution module 104 executes the fact-of-editing display processing by displaying, on the record detail screen SC2 in the view mode, a message M26 indicating that the first user is editing the record. The message M26 may include only the fact that someone is editing the record without including the name of the first user. When two or more users are editing the record, the message M26 corresponding to the number of users may be displayed. The message M26 may include the name of the second user.

The fact-of-editing display processing is not limited to the example of FIG. 14, as long as the fact-of-editing display processing is processing for allowing visual recognition of the fact that the editing is in progress. For example, instead of displaying the message M26, displaying another image such as an icon or displaying a push notification may correspond to the fact-of-editing display processing. The processing execution module 104 may execute the fact-of-editing display processing by executing those plurality of processing examples in combination.

Further, when the record detail screen SC2 in the edit mode is displayed on the second user terminal 20B, the processing execution module 104 may also execute the same fact-of-editing display processing as that of FIG. 14. For example, when the first user starts the editing of the record, the processing execution module 104 may execute the edited part display processing by displaying the message M26 or another image on the record detail screen SC2 in the edit mode.

Further, through combination of Modification Examples 1 and 4, the processing execution module 104 may execute the fact-of-editing display processing based on the content edited by the first user and the content edited by the second user. Through combination of Modification Examples 2 and 4, the processing execution module 104 may execute the fact-of-editing display processing together with the automatic reflection processing. Through combination of Modification Examples 3 and 4, the processing execution module 104 may execute the fact-of-editing display processing together with the edited part display processing. Through combination of Modification Examples 1 to 4, the processing execution module 104 may execute the automatic reflection processing, the edited part display processing, and the fact-of-editing display processing based on the content edited by the first user and the content edited by the second user.

When it is determined that the web database DB is being edited through the first interface, the web database system 1 according to Modification Example 4 executes, as the predetermined processing, the fact-of-editing display processing for displaying, on the second interface, the information that can identify that the web database DB is being edited through the first interface. Accordingly, it is possible to recognize that the web database DB is being edited through another interface, thereby increasing the convenience of the web database DB.

5-5. Modification Example 5

For example, when the second user outranks the first user in terms of the job title, it may be preferred to prioritize the content edited by the second user over the content edited by the first user. In contrast, when the first user outranks the second user in terms of the job title, it may be preferred to prioritize the content edited by the first user over the content edited by the second user. Thus, the predetermined processing may be executed in consideration of some relative user attribute relationship (for example, hierarchical or strength relationship) between the first user and the second user.

The processing execution module 104 in Modification Example 5 executes the predetermined processing based on a first user attribute regarding the first user on the first interface and a second user attribute regarding the second user on the second interface. In the following description, when the first user attribute and the second user attribute are not distinguished, the term "user attribute" is simply used. The user attribute is information that can classify each user. For example, an organization, a job title, a department, the year of employment, or an administrative authority (role) of the web database DB corresponds to the user attribute. It is assumed that the user attribute is recorded in advance in the data storage unit 100.

For example, the processing execution module 104 determines whether or not to execute the predetermined processing based on the first user attribute and the second user attribute. Taking the job title as an example, the processing execution module 104 may not execute the predetermined processing when the job title indicated by the first user attribute is higher than the job title indicated by the second user attribute, and may execute the predetermined processing when the job title indicated by the first user attribute is lower than the job title indicated by the second user attribute. In contrast, the processing execution module 104 may not execute the predetermined processing when the job title indicated by the first user attribute is lower than the job title indicated by the second user attribute, and may execute the predetermined processing when the job title indicated by the first user attribute is higher than the job title indicated by the second user attribute.

The web database system 1 according to Modification Example 5 executes the predetermined processing based on the first user attribute and the second user attribute. Accordingly, the predetermined processing is executed in consideration of the relationship between the first user attribute and the second user attribute, thereby increasing the convenience of the web database DB.

5-6. Other Modification Examples

For example, Modification Examples 1 to 5 may be combined.

For example, in the at least one embodiment and Modification Examples 1 to 5, the cases in which the first user has edited or is editing a record while the second user is viewing or editing the record have been taken as examples, but the same processing may be executed when the user has a plurality of windows or tabs open. For example, in a case in which, while viewing or editing a record on or through a second window, a certain user moves on to another task and forgets the fact that the second window is still open, when the certain user has edited or is editing the same record through a first window, the message M24 or M25 may be displayed or the automatic reflection processing may be executed on the second window. The same applies to the tabs. In those cases, each of the plurality of windows or tabs opened by the same user corresponds to the interface.

For example, the predetermined processing may be exclusive processing that inhibits the web database DB from being edited. The exclusive processing may be executed by inhibiting the second user from selecting the edit button B21 or the save button B23 while the first user is editing a record. For example, the web database system 1 can also be applied to services other than the task support service. For example, the web database system 1 may be applied to a service that provides the web database DB in which data irrelevant to tasks is stored. For example, the web database system 1 may be applied to a service that provides the web database DB in which content such as videos for entertainment is stored.

For example, each function described above may be implemented by any device in the web database system 1. For example, the functions described as being implemented by the server 10 may be implemented by the user terminal 20. In this case, the same function as that of the server 10 may be implemented by being executed by a script on the browser or being executed by an application installed on the user terminal 20. For example, the functions described as being implemented by the user terminal 20 may be implemented by the server 10. For example, the respective functions may be implemented by one computer instead of being shared by a plurality of computers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A web database system, which allows concurrent editing operations of a web database through a plurality of interfaces, the web database system comprising at least one processor configured to:

determine one of whether the web database has been edited through a first interface among the plurality of interfaces or whether the web database is being edited through the first interface by determining whether a save request or an edit request of the web database has been received from the first interface;

determine whether the web database is being edited through a second interface among the plurality of interfaces by determining whether the edit request has been received from the second interface; and execute predetermined processing relating to the web database for the second interface based on content edited through the first interface and content edited through the second interface in one of a case in which it has been determined that the web database has been edited through the first interface or a case in which it has been determined that the web database is being edited through the first interface and in a case in which the web database is being edited through the second interface;

wherein the predetermined processing is fact-of-editing display processing, which comprises a pop-up message; and wherein the pop-up message must be acknowledged before editing can be performed.

2. The web database system according to claim 1, wherein the at least one processor is configured to execute, when the web database is being displayed on the second interface, the predetermined processing based on content edited through the first interface.

3. The web database system according to claim 1, wherein the at least one processor is configured to execute, in one of a case in which the web database has been edited through the second interface as well or a case in which the web database is being edited through the second interface as well, the predetermined processing based on content edited through the first interface and content edited through the second interface.

4. The web database system according to claim 1, wherein the at least one processor is configured to execute, as the predetermined processing, automatic reflection processing for automatically reflecting content edited through the first interface in the second interface.

5. The web database system according to claim 1, wherein the at least one processor is configured to execute, as the predetermined processing, edited part display processing for displaying a part edited through the first interface so as to be identifiable on the second interface.

6. The web database system according to claim 1, wherein the at least one processor is configured to:

determine one of whether the same record in the web database as one of a record being displayed on the second interface or a record being edited through the second interface has been edited through the first interface or whether the same record is being edited through the first interface; and execute the predetermined processing in one of a case in which it has been determined that the same record has been edited through the first interface or a case in which it has been determined that the same record is being edited through the first interface.

7. The web database system according to claim 1, wherein the at least one processor is configured to:

determine one of whether the web database is being edited through the first interface or whether the web database has been edited through the first interface; and execute, as the predetermined processing, in one of a case in which it has been determined that the web database is being edited through the first interface or a case in which it has been determined that the web database has been edited through the first interface, fact-of-editing display processing for displaying, on the second interface, one of information with which it is identifiable that the web database is being edited through the first interface or information with which it is identifiable that the web database has been edited through the first interface.

8. The web database system according to claim 7, wherein the at least one processor is configured to execute the fact-of-editing display processing based on a status regarding the web database on the second interface.

9. The web database system according to claim 1, wherein the second interface is not updated in real time.

10. A web database system, which allows concurrent editing operations of a web database through a plurality of interfaces, the web database system comprising at least one processor configured to:

determine one of whether the web database has been edited through a first interface among the plurality of interfaces or whether the web database is being edited through the first interface by determining whether a save request or an edit request of the web database has been received from the first interface;

determine whether the web database is being edited through a second interface among the plurality of interfaces by determining whether the edit request has been received from the second interface;

execute predetermined processing relating to the web database for the second interface based on content edited through the first interface and content edited through the second interface in one of a case in which it has been determined that the web database has been edited through the first interface or a case in which it has been determined that the web database is being edited through the first interface and in a case in which the web database is being edited through the second interface;

wherein the predetermined processing is fact-of-editing display processing, which comprises a pop-up message; and wherein the second interface must be refreshed before editing can be performed.

11. A web database system, which allows concurrent editing operations of a web database through a plurality of interfaces, the web database system comprising at least one processor configured to:

determine one of whether the web database has been edited through a first interface among the plurality of interfaces or whether the web database is being edited through the first interface; and execute predetermined processing relating to the web database for a second interface among the plurality of interfaces in a case when a first user attribute regarding a first user on the first interface is higher than a second user attribute regarding a second user on the second interface and in one of a case in which it has been determined that the web database has been edited through the first interface or a case in which it has been determined that the web database is being edited through the first interface wherein the first user attribute and the second user attribute indicates a classification of the user;

wherein the predetermined processing is fact-of-editing display processing, which comprises a pop-up message; and wherein the pop-up message must be acknowledged before editing can be performed.

12. The web database system according to claim 11, wherein the first user attribute and the second user attribute indicate a job title.

* * * * *